(12) United States Patent
Liu et al.

(10) Patent No.: US 11,594,013 B2
(45) Date of Patent: Feb. 28, 2023

(54) SYSTEM, DEVICE, AND METHOD FOR IMAGE ANOMALY DETECTION

(71) Applicant: FEDERAL HOME LOAN MORTGAGE CORPORATION, McLean, VA (US)

(72) Inventors: Wenhua Liu, Rockville, MD (US); Ming Xiong, Great Falls, VA (US)

(73) Assignee: FEDERAL HOME LOAN MORTGAGE CORPORATION, McLean, VA (US)

( * ) Notice: Subject to any disclaimer, the term of this patent is extended or adjusted under 35 U.S.C. 154(b) by 432 days.

(21) Appl. No.: 16/852,891

(22) Filed: Apr. 20, 2020

(65) Prior Publication Data
US 2020/0250464 A1 Aug. 6, 2020

Related U.S. Application Data

(63) Continuation of application No. 16/410,300, filed on May 13, 2019, now Pat. No. 10,650,269, which is a
(Continued)

(51) Int. Cl.
*G06K 9/00* (2022.01)
*G06V 10/75* (2022.01)
*G06Q 30/02* (2023.01)
*G06V 10/44* (2022.01)
*G06V 10/98* (2022.01)

(52) U.S. Cl.
CPC ....... *G06V 10/751* (2022.01); *G06Q 30/0278* (2013.01); *G06V 10/44* (2022.01); *G06V 10/993* (2022.01)

(58) Field of Classification Search
CPC .... G06V 10/993; G06V 30/10; G06V 10/243; G06V 10/28; G06V 10/32; G06V 10/98; G06V 30/1475; G06V 30/162; G06V 30/166; G06V 30/2253; G06V 10/30; G06V 10/40; G06V 10/467; G06V 10/507; G06V 10/56; G06V 10/60; G06V 10/95; G06V 30/142; G06V 30/164; G06V 30/18095; G06V 30/40; G06T 2207/30144; G06T 7/001; G06T 7/0002; G06T 2207/10004; G06T 2207/30168; G06T 7/00

See application file for complete search history.

(56) References Cited

U.S. PATENT DOCUMENTS 6,611,809 B1 8/2003 Zhu
10,325,177 B1 6/2019 Liu
(Continued)

*Primary Examiner* — Alex Kok S Liew
*Assistant Examiner* — Alex Liew
(74) *Attorney, Agent, or Firm* — Oblon, McClelland, Maier & Neustadt, L.L.P.

(57) ABSTRACT

Systems and methods for detecting image anomalies include extracting one or more detected images from a submission file received from at least one computing device and generating an image identification (ID) for each of the one or more images. One or more image quality indices are determined for the submission file based on at least one of predetermined image features, an image type of the one or more images, and submission file attributes, and one or more image anomalies associated with the one or more images of the submission file are detected based on at least one of the image ID and the one or more image quality indices.

17 Claims, 20 Drawing Sheets

Related U.S. Application Data continuation of application No. 15/710,655, filed on Sep. 20, 2017, now Pat. No. 10,325,177, which is a continuation of application No. 15/380,300, filed on Dec. 15, 2016, now Pat. No. 9,798,954.

(56) References Cited

U.S. PATENT DOCUMENTS

| | | |
|---|---|---|
| 2006/0120818 A1 | 6/2006 | Mizoguchi |
| 2006/0245634 A1 | 11/2006 | Soenksen |
| 2007/0071304 A1 | 3/2007 | Kuchii |
| 2008/0147516 A1* | 6/2008 | Rousso ............... G06Q 20/10 705/26.1 |
| 2009/0214085 A1* | 8/2009 | Bickell ............... G06V 10/98 382/112 |
| 2013/0085815 A1* | 4/2013 | Onischuk ............ G07C 13/00 235/386 |
| 2014/0219364 A1* | 8/2014 | Gu ...................... H04N 19/154 375/240.26 |

* cited by examiner

| Image ID 602 | Image Index 604 | Image Type 1st Guess 606 | 1st Guess Probability 608 | Image Type 2nd Guess 610 | 2nd Guess Probability 612 | Comp Flag 614 | Size 616 | Average Brightness 618 | Average Contrast 620 | Average Smoothness 622 | Average Directionality 624 | Average Edge Ratio 626 | Regional Features 628 |
|---|---|---|---|---|---|---|---|---|---|---|---|---|---|
| 1 | 2 | 3 | 4 | 5 | 6 | 7 | 8-9 | 10-13 | 14-17 | 18 | 19 | 20 | 21-45 |

| 702 | 704 | 706 | 708 | 710 | 712 | 714 | 716 | 718 | 720 | 722 | 724 | 726 | 728 | 730 | 732 | 734 |
|---|---|---|---|---|---|---|---|---|---|---|---|---|---|---|---|---|
| Doc ID | Form ID | vacType | purType | condType | qNum | cNum | # Int | # Ext | # Comp | # Other | indexFC | indexR | indexB | indexIC | indexSC | # Rooms |
| 1 | 2 | 3 | 4 | 5 | 6 | 7 | 8 | 9 | 10 | 11-15 | 16-17 | 18-19 | 20-21 | 22-23 | 24 | 25 |

Image Anomaly Report

1302

Appraisal Information
- ○ Appraisal Type
- ○ Appraiser
- ○ Mortgage Type
- ○ Address
- ○ Inspection time
- ○ Type of dwelling

1304

Detected Duplicate Images
- ☑ Duplicate images detected (6)
- ☐ No duplicate images detected

[Click for Duplicate Image Information]

1306

Image Quality Issues
- ☑ File Completeness
- ☐ Image Resolution
- ☐ Image Brightness
- ☐ Image Contrast
- ☐ Size Consistency

1308

Image Modifications
- ☑ Images modified but meet specifications
- ☐ Images modified and do not meet specifications
- ☐ Images not modified

1310

Recommendations
- ☑ Submit new report
- ☐ Disapprove representation and warranty relief

*Fig. 13*

SYSTEM, DEVICE, AND METHOD FOR IMAGE ANOMALY DETECTION

CROSS REFERENCE TO RELATED APPLICATION

The present application is a continuation of U.S. application Ser. No. 16/410,300, filed on May 13, 2019, which is a continuation of U.S. application Ser. No. 15/710,655, filed on Sep. 20, 2017, (now U.S. Pat. No. 10,325,177), which is a continuation of U.S. application Ser. No. 15/380,300, filed on Dec. 15, 2016 (now U.S. Pat. No. 9,798,954), the entire contents of all of which are hereby incorporated by reference.

SUMMARY

In an exemplary implementation, systems and methods for detecting image anomalies include extracting one or more detected images from a submission file received from at least one computing device and generating an image identification (ID) for each of the one or more images. One or more image quality indices are determined for the submission file based on at least one of predetermined image features, an image type of the one or more images, and submission file attributes, and one or more image anomalies associated with the one or more images of the submission file are detected based on at least one of the image ID and the one or more image quality indices.

BRIEF DESCRIPTION OF THE FIGURES

FIG. 4B is an exemplary illustration of an image ID;

FIG. 6 is an exemplary diagram of an image data table format;

FIG. 7 is an exemplary diagram of a summary data table format;

FIG. 13 is an exemplary illustration of an image anomaly report;

Like reference symbols in various drawing indicate like elements.

DETAILED DESCRIPTION

Figure 1:
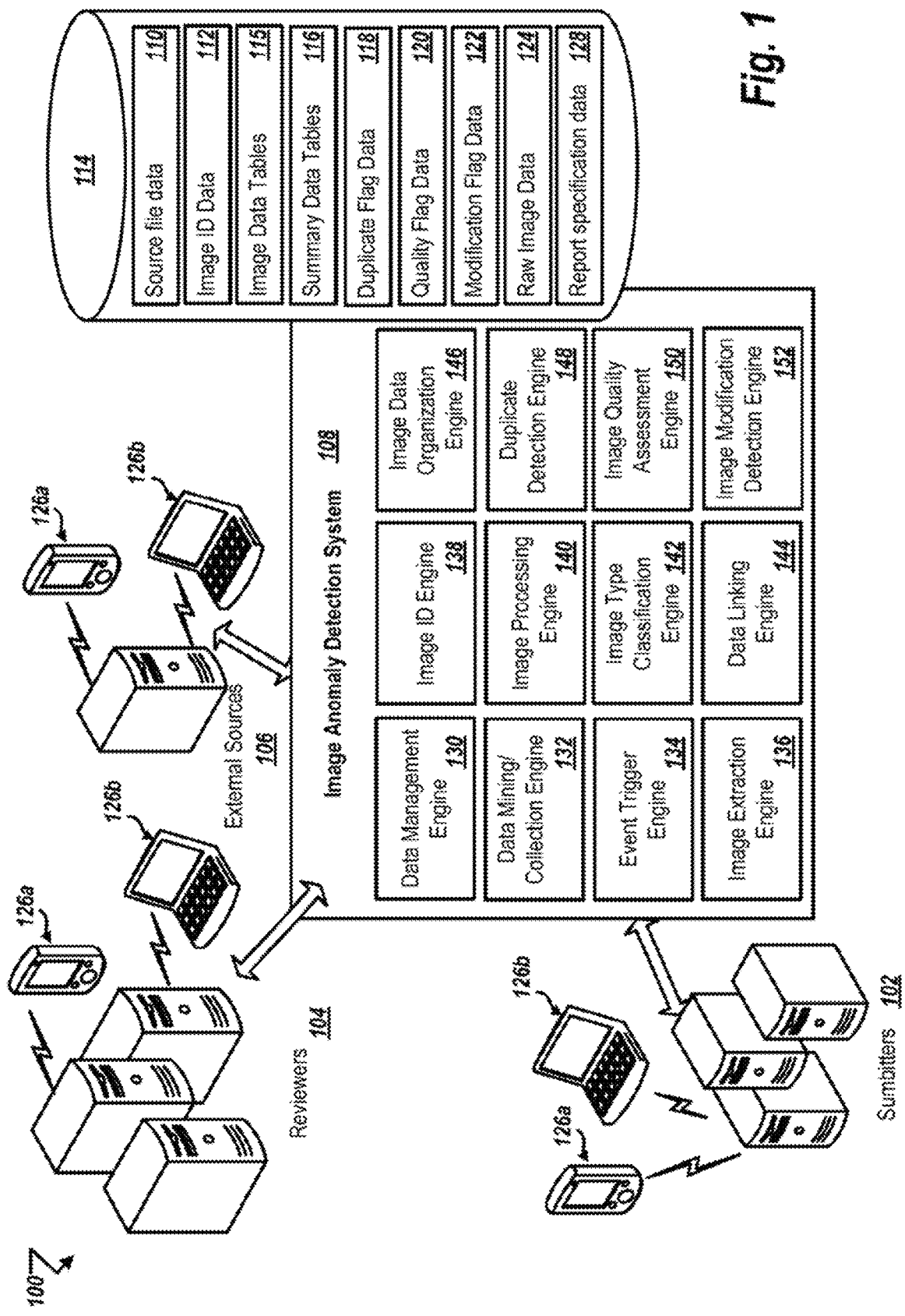
FIG. 1 is an exemplary diagram of an example environment for an image anomaly detection system.

FIG. 1 is a diagram of an example environment 100 for an image anomaly detection system 108. The diagram illustrates a series of interactions between one or more participants and devices in the image anomaly detection system 108 which is configured to detect anomalies or problems with images. For example, the image anomaly detection system 108 could detect anomalies or problems with images that are included in submitted property appraisal reports, which can be indicative of a submission error or fraud. Throughout the disclosure, the appraisal reports can be interchangeably referred to as submission files. In some implementations, the image anomaly detection system 108 can detect duplicate images that have been previously submitted with other appraisal reports based on an image identification (ID) that is generated for the images in the appraisal report. The image anomaly detection system 108 can also detect images that do not meet image quality standards for image submissions with an appraisal report as well as images that have been enhanced or modified, which may indicate that an appraiser submitting the appraisal report may be attempting to conceal a current condition of a property. The image anomaly detection system 108 can determine the quality of the images in the appraisal report as well as whether the images have been modified based on determined quality indices that represent various features of the images in the appraisal report. For example, the quality indices can represent file completeness, image resolution, image brightness, image contrast, size consistency, or any other type of quality index. The image anomaly detection system 108 may be associated with a particular agency that reviews and/or approves appraisals for mortgages, such as mortgage lenders, mortgage buyers, and the like.

In certain embodiments, the image anomaly detection system 108 automates and expedites processing and approval or disapproval of submitted appraisal reports. For example, costs and time associated with using manual, non-computerized appraisal report review implementations limit the number of appraisal reports that can be reviewed. In one example, manually-performed appraisal report reviews may only be conducted on a small percentage of a submitted report population, which means that there is a high probability that fraudulent reports or other reports that include errors may go undetected. For example, a person performing manual reviews can review approximately ten reports per day. On the other hand, the image anomaly detection system 108 can process 100% of submitted appraisal reports while drastically reducing processing time. In one implementation, the image anomaly detection system 108 can process approximately half a million appraisal reports submitted during a month within a magnitude of ten hours. The image anomaly detection system 108 is also able to detect features of images that a person is unable to detect, such as slight variations in contrast, brightness, resolution, image size, etc., and therefore provides a more robust analysis of appraisal reports. The image anomaly detection system 108 therefore represents a technical solution to a technical problem that has plagued the industry. Using the system, lenders will be provided more accurate data allowing them to more efficiently lend thereby improving the lending process and the overall economy while also reducing incidents of fraud or inadvertent inaccurate reporting. The image anomaly detection system 108 also provides improvements to various technical fields such as data management, data storage and image analysis.

Submitters 102 include a plurality of computing devices and databases distributed across a widely dispersed network that may be distributed across a large, international geographic area. The submitter network can be separate and independent from any network associated with any other participant or entity in the image anomaly detection environment 100, such as external sources 106 or reviewers 104. In some implementations, the submitters 102 can include appraisers who produce and submit property appraisal reports to the image anomaly detection system 108 via one or more computing devices 126 that can include mobile device 126a, computer 126b, or any other type of external computing device.

In addition, the submitters 102 can submit the appraisal reports to the image anomaly detection system 108 in a predetermined format, such as in PDF format or any other document format. In some implementations, the appraisal reports can be submitted at one or more user interface screens via a website where the submitters 102 upload appraisal report data along with appraisal images to the image anomaly detection system 108. The data provided to the image anomaly detection system 108 from the submitters 102 may be independent from the other participants and in a different format than the data provided by the external sources 106 and reviewers 104. Alternatively, the image anomaly detection system 108 can proactively access data uploaded by the submitters 102 on various different platforms such as submitter-local sources and/or the external sources 106.

The reviewers 104 include a plurality of computing devices and databases distributed across a widely dispersed network that may be distributed across a large, international geographic area. In some implementations, the reviewers 104 can include mortgage lenders or buyers or any entity that reviews submitted property appraisal reports. The reviewer network can be separate and independent from any network associated with any other participant in the image anomaly detection environment 100, such as the external sources 106 or submitters 102. The reviewers 104 can provide inputs to the image anomaly detection system 108 that can include specifications and standards for appraisal reports, such as image quality specifications (e.g., resolution, brightness, contrast, size consistency) as well as numbers and types of photos that correspond to a complete appraisal report that are based on number of rooms in the property, whether the appraisal is for a property exterior and/or interior, whether the appraisal report is associated with a resubmission, and the like, which can be stored in the data repository 114 as report specification data 128.

The reviewers 104 can also receive outputs from the image anomaly detection system 108 that may include a results report from an image anomaly detection process. In some implementations, the results report includes information regarding anomalies that have been detected with the submitted reports that can include submitted images that are duplicates of images that have been submitted with previous reports, images that do not meet predetermined quality standards, and detected modifications to the submitted images. The data provided to the image anomaly detection system 108 from the reviewers 104 may be independent from the other participants and in a different format than the data provided by the external sources 106 and submitters 102.

The external sources 106 include a plurality of computing devices and databases distributed across a widely dispersed network that may be distributed across a large, international geographic area. The external source networks can be separate and independent from any network associated with any other participant in the image anomaly detection environment 100, such as the submitters 102 or reviewers 104. In addition, the data handled and stored by the external sources 106 may be in a different format than the data handled and stored by the other participants of in the image anomaly detection environment 100. In some implementations, the external sources 106 may include public data sources that include property images and information that may be accessible to other participants in the image anomaly detection environment, such as the submitters 102 and reviewers 104. For example, the external sources 106 can be connected to the image anomaly detection system 108 via a wired or wireless network and can include public property records systems, multiple listing service (MLS) systems, mapping service systems such as GOOGLE MAPS, and any other data source that provides images of properties that may be associated with submitted appraisal reports. The data provided to the image anomaly detection system 108 from the external sources 106 may be independent from the other participants and in a different format than the data provided by the submitters 102 or reviewers 104.

The submitters 102, reviewers 104, and external sources 106, and data repository 114 can connect to the image anomaly detection system 108 through computing devices 126 (e.g., mobile device 126a, computer 126b, or any other type of computing device) via a wired or wireless network (not shown). The network can include one or more networks, such as the Internet and can also communicate via wireless networks such as WI-FI, BLUETOOTH, cellular networks including EDGE, 3G and 4G wireless cellular systems, or any other wireless form of communication that is known.

The image anomaly detection system 108 includes one or more engines or modules that perform processes associated with receiving submitted appraisal reports, processing images in the appraisal reports, and detecting anomalies that may be presented in the images. References to the engines or modules throughout the disclosure are meant to refer to software processes executed by circuitry of one or more processing circuits, which can also be referred to interchangeably as processing circuitry. In some implementations, the processes associated with the image anomaly detection system 108 can be performed by one or more servers having one or more processing circuits such that some steps may be performed on different servers. In one example, the image anomaly detection system 108 includes a data management engine 130 that organizes the data received by the image anomaly detection system 108 from the submitters 102, reviewers 104, and external sources 106 and also controls data handling during execution of the processes described further herein. In some implementations, the data management engine 130 processes data gathered by a data mining/collection engine 132 from the external sources 106 and loads the gathered data to data repository 114 as source file data 110, which can be a database of data files of the appraisal reports received from the submitters 102. The data management engine 130 also receives submitted appraisal reports for the submitters 102 from the data mining/collection engine 132, which are also stored as source file data 110. In addition, the data management engine 130 may perform a data validation/normalization process to configure the received appraisals and other source file data 110 into a predetermined format compatible with a format of the files of the data repository 114 and ensure that data associated with the appraisal reports have been properly completed. The source file data 110 can also include submission file attributes included in the appraisal report, such as number of rooms in the property, whether the appraisal is for a property exterior and/or interior, whether the appraisal report is associated with a resubmission, name and/or identification information associated with the appraiser submitting the report, inspection time, property location, appraisal value, and any other information included in the submitted appraisal report. For source file data 110 associated with one or more of the external sources 106

The data management engine 130 also controls the interaction of the image anomaly detection system 108 with at least one data repository 114 associated with the image anomaly detection environment 100. For example, the data management engine 130 can output automatically updated data such as image ID data 112, image data tables 115, and summary data tables 116 to the data repository 114. In some implementations, the data uploaded to the data repository 114 can be either manually or automatically updated. For example, duplicate flag data 118, quality flag data 120, and modification flag data 122 that indicate detected anomalies with the images in the submitted appraisal reports can be automatically generated by duplicate detection engine 148, image quality assessment engine 150, and image modification detection engine 152 as will be described in further detail herein. The data management engine 130 can also access any of the data from the data repository 114 for use by the image anomaly detection system 108, such as the image data tables 115 and the summary data tables 116. The data management engine 130 controls the flow of data between the data repository 114 and the image anomaly detection system 108.

The image anomaly detection system 108 also includes a data mining/collection engine 132 that controls the gathering of data from the reviewers 104, submitters 102, and external sources 106 in real-time. In some implementations, the data mining/collection engine 132 receives the appraisal reports input to the image anomaly detection system 108 by the submitters 102 and passes the submitted appraisal reports to the data management engine 130 and automatically passes the submitted reports to the data management engine 130. In addition, the data mining/collection engine 132 can receive automatically and/or continuously updated data from one or more of the external sources 106. For example, when a MLS listing website is updated with a new listing, the data mining/collection engine 132 can receive the data associated with the new listing, which is stored in the source file data 110 of the data repository 114. The data mining/collection engine 132 can also perform web crawling processes to detect data updates at websites associated with the external sources 106. For example, the data mining/collection engine 132 can monitor websites and servers associated with MLS systems, public records systems (e.g., tax information systems), or mapping service systems to detect updated property images and associated information. In addition, the data mining/collection engine 132 can receive other manually entered information from the participants in the image anomaly detection environment 100, such as the specifications and standards for appraisal reports that can be input by the reviewers 104.

The image anomaly detection system 108 also includes an event trigger engine 134 that manages the flow of data updates to the image anomaly detection system 108. In some implementations, the event trigger data 132 detects updates to source file data 110, image ID data, or any other type of data collected or controlled by the image anomaly detection system 108. For example, the event trigger engine 134 detects modifications or additions to the files of the image data tables 115 or summary data tables 116, which may indicate that a new set of images associated with an appraisal report has been processed. In response to detecting an update to the image data tables and/or summary data tables 116, the event trigger engine 134 loads the updated data tables to the duplicate detection engine 148, image quality assessment engine 150, and image modification detection engine 152 so that image anomalies can be detected. In addition, the event trigger engine 134 operates automatically to trigger the data management engine 130 when updated data is detected by the data/mining and collection engine 132.

In addition, the event trigger engine 134 is configured to detect updates to the data stored in the data repository 114 from the one or more data sources at multiple update velocities. The update velocity of the data corresponds to a rate or frequency at which the image anomaly detection system 108 receives data updates from the various submitters 102 and external sources 106. For example, property images and associated data detected at websites associated with the external sources 106 may be updated at varied frequencies, and submitters 102 may submit appraisal reports to the image anomaly detection system 108 at varied times and frequencies.

The image anomaly detection system 108 also includes an image extraction engine 136 that extracts the images included in the appraisal reports submitted by the submitters 102. In some implementations, the appraisal reports are submitted in a predetermined file format (e.g., as a PDF), and the image extraction engine 136 scans the submitted file to detect the images. In some implementations, the image extraction engine 136 can apply any type of image processing tool that is able to detect images in scanned files or any other type of file, such as a mixed raster content (MRC) tool that separates the submitted appraisal report into a background mask and a foreground layer. The image extraction engine 136 groups the detected images into a set of raw images that are stored in the data repository 114 as raw image data 124. For appraisal reports that are submitted via a user interface at a website, the image extraction engine 136 collects the uploaded images in to a set of raw image files that are also stored as the raw image data 124. The image extraction engine 136 can also extract the images from the websites of the external sources 106 detected by the data mining/collection engine 132.

In response to extracting the images from a submitted appraisal report, an image identification (ID) engine 138 generates an image ID for each image in an appraisal report that characterizes each image based on one or more features of the image. In one implementation, the image ID is a multi-digit number that corresponds to brightness values of one or more pixels of an image and is used to detect duplicate images from previously submitted appraisal reports that are included in a submitted appraisal report. In some implementations, features other than brightness values can also be used separately or in combination to generate the image ID, such as image contrast or any other feature. The digits of the image ID can also include other types of characters such as letters or special characters. The number of digits included in the image ID can be based on processing capabilities of the processing circuits associated with the image ID engine 138 as well as a false positive rate associated with a particular number of digits. For example, as the number of digits included in the image ID is increased, the number of false positive detections decreases, but processing efficiency decreases. In one example, the image ID includes eighteen digits, which represent brightness values for nine pixels in three channels (e.g., red, blue, green) or planes of the image. The image ID provides increased processing efficiency for the image anomaly detection system 108 by reducing an amount of processing that is performed in order to detect duplicate images. Details regarding the generation of the image ID are discussed further herein.

The image anomaly detection system 108 also includes an image processing engine 140 that detects various features associated with each of the images submitted in an appraisal report that are used to characterize the images, which can be referred to as image data. In some implementations, the features can include image size, average brightness and contrast values for each channel, average smoothness, directionality, and edge ratio values for the image as well as features associated with various regions of the image. The detected image features are used to determine a type of image, whether the images meet predetermined quality standards for appraisal reports, and whether the images have been modified.

In response to the detection of the various features of the images by the image processing engine 140, an image type classification engine 142 determines an image type for each image (e.g., outside view, inside view, street map, satellite map, building sketch (also referred to as a hand drawn image), certificate, scanned documents) based on both global and regional features (e.g., image size, brightness, contrast, smoothness, directionality, edge ratio) detected by the image processing engine 140. In some implementations, the image type classification engine 142 uses supervised machine learning techniques to determine the image type. In one example, the image type classification engine 142 may be trained with a set of approximately 13,000 images to achieve an overall out-of-sample accuracy of over 90% in classifying the image types of the images submitted in appraisal reports. Details regarding the image type classification performed by the image type classification engine 142 are discussed further herein.

The image processing system 108 also includes a data linking engine 144 that links the image data for the images of an appraisal report with the corresponding image IDs, image types, and submission file attributes associated with the submitted appraisal reports, which is then stored by an image data organization engine 146 into one or more data tables. For example, in response to receiving linked data from the data linking engine 144, the image data organization engine 146 organizes the linked data into image data tables 115 and summary data tables 116. The image data tables 115 include one or more entries for each of the images in a submitted appraisal report that include the image ID, image type, size, brightness, contrast, smoothness, directionality, edge ratio, regional features, and any other features of the image. The entries included in the image data tables 115 are used by the image data organization engine 146 to produce the summary data tables 116. A summary data table is produced for each appraisal report, and the entries of the summary data tables 116 characterize the type of appraisal reports as well as the images included in the appraisal reports. For example, the summary data tables can include entries for a document ID for the appraisal report, an ID for the type of appraisal, occupancy of the property, type of transaction, condition of the property, numbers of exterior, interior, and other types of images, number of rooms, and one or more image quality indices that represent a quality of the images submitted in the report. For example, the image quality indices can include a file completeness index, an image resolution index, an image brightness index, an image contrast index, and a size consistency index. Details regarding the generation of the image data tables 115 and the summary data tables 116 are discussed further herein.

The image anomaly detection system 108 also includes one or more anomaly detection engines that perform various processes associated with detecting errors and potentially fraudulent appraisal reports. This includes in exemplary implementations a duplicate detection engine 148, an image quality assessment engine 150, and an image modification detection engine 152. For example, the duplicate detection engine 148 detects duplicate images that have been previously submitted with other appraisal reports based on the image IDs of the images. The duplicate detection engine 148 can also determine whether the duplicate images are associated with false positive occurrences based on locations of the properties associated with the duplicate images, appraisers submitting the reports, whether the duplicate images are associated with an appraisal resubmission or a particular type of image. If the number of non-false positive duplicate images is greater than a predetermined threshold, then the duplicate detection engine 148 can output a duplicate flag. The image quality assessment engine 150 determines whether the images submitted with appraisal reports meet the predetermined image quality specifications based on the one or more image quality indices included in the summary tables 116. In some examples, submitters 102 who are attempting to disguise certain problematic aspects of a property may intentionally submit poor quality images that mask the problem aspects. If one or more of the image quality indices are less than a predetermined threshold, then the image quality assessment engine 150 may output a quality flag. In addition, the image modification engine 152 determines whether any of the submitted images have been modified from an original version, which may indicate that the submitter 102 is attempting to cover up an issue with the property. If the number of modified images is greater than a predetermined threshold, then the image modification engine 152 may output a modification flag. Details regarding the processes performed by the anomaly detection engines are discussed further herein.

In some implementations, data associated with the processes performed by the image anomaly detection system 108 is stored in one or more data repositories of the image anomaly detection environment 100 such as the data repository 114. Data received by or obtained from the image anomaly detection system 108 from the submitters 102, reviewers 104, and external sources 106 can be stored in real-time with respect to when the data is received from the data sources. In addition, one or more types of data can be stored automatically in response to receiving one or more data files from the data sources. The data stored in the data repository 114 can be auto load data that is updated automatically from one or more sources at predetermined time intervals or whenever new or updated data is detected. For example, auto load data can include the source file data 110 associated with the servers/websites of the external sources 106 that is automatically updated based on the web crawling processes performed by the data mining/collection engine 132.

The data stored in the data repository 114 can also include manually entered information that is input via UIs, such as those of the external devices 126, and is received by the data mining/collection engine 132 of the image anomaly detection system 108. The manually entered information can be processed by the data management engine 130 before being disseminated to other processing engines of the image anomaly detection system 108. The manually entered data can include the source file data 110 associated with the submitted appraisal reports as well as the raw image data 124 of the images extracted from the submitted appraisal reports by the image extraction engine 136 extracted from the submitted appraisals. The manually entered data can also include the report specification data 128 received from the reviewers 104.

The data repository 114 can also store process execution data that is generated by the image anomaly detection system 108 when executing the processes associated with detecting image anomalies. For example, the process execution data can include the image ID data 112 that includes the image IDs of all of the images processed by the image anomaly detection system 108, image data tables 115 and summary data tables 116 for processed appraisal reports, as well as data that represents detected image anomalies, such as duplicate flag data 118, quality flag data 120, and modification flag data 122. In some implementations, the raw image data 124, image file names, image data tables 115, summary data tables 116 can be stored as a single file that includes four tables.

Figure 2:
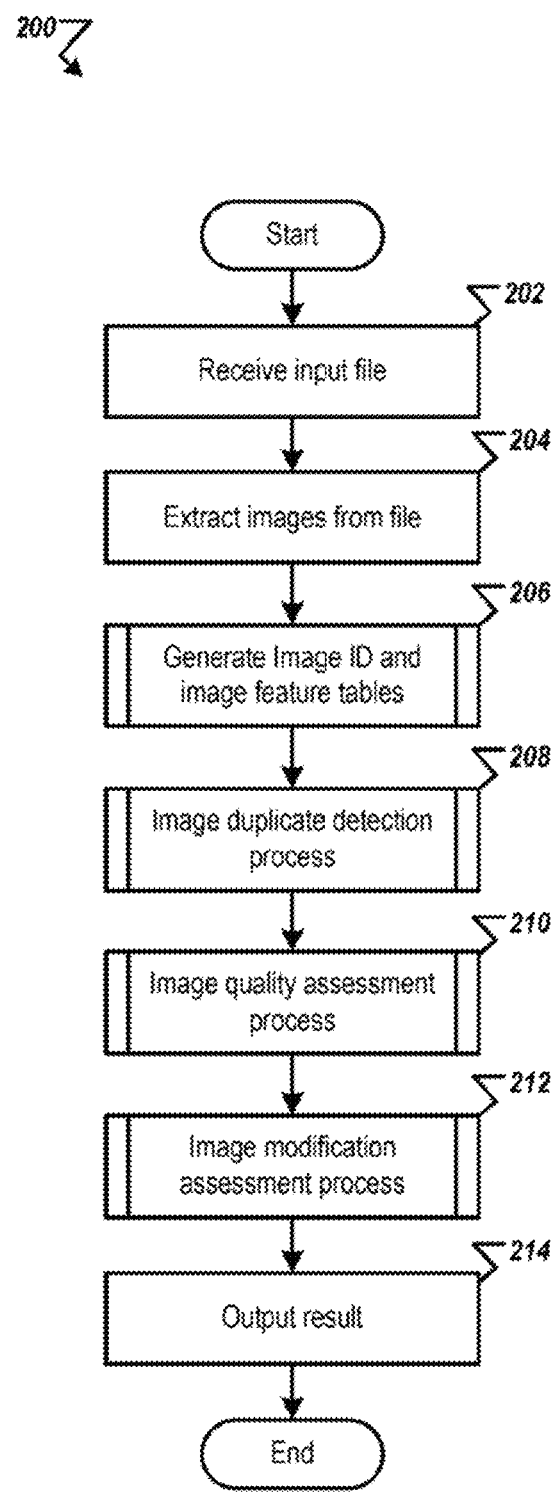
FIG. 2 is an exemplary flowchart of an image anomaly detection process.

FIG. 2 is an exemplary flowchart of an image anomaly detection process 200. One or more of the steps of the image anomaly detection process 200 can be performed in series, parallel, or in any order other than the order of steps described herein. The image anomaly detection process 200 is performed by one or more of the processing engines of the image anomaly detection system 108.

At step 202, the data mining/collection engine 132 receives or obtains an appraisal report from one or more of the submitters 102. The submitters 102 can submit the appraisal reports to the image anomaly detection system 108 in a predetermined format, such as in PDF format or any other document format. In some implementations, the appraisal reports can be submitted at one or more user interface screens via a website where the submitters 102 upload appraisal report data along with appraisal images to the image anomaly detection system 108. Alternatively, the image anomaly detection system 108 can proactively obtain appraisal reports from external sources such as submitter-local sources of the external sources 106.

At step 204, in response to obtaining the appraisal report from the submitter 102, the image extraction engine 136 extracts the images from the appraisal report. In some implementations, the image extraction engine 136 scans a submitted appraisal report file to detect the images. For example, the image extraction engine 136 can apply any type of image processing tool that is able to detect images in scanned files or any other type of file, such as the MRC tool that separates the submitted appraisal report into a background mask and a foreground layer. The image extraction engine 136 groups the detected images into a set of raw images that are stored in the data repository 114 as the raw image data 128. For appraisal reports that are submitted via a user interface at a website, the image extraction engine 136 collects the uploaded images in to a set of raw image files that are also stored as the raw image data 128. The image extraction engine 136 can also extract the images from the websites of the external sources 106 detected by the data mining/collection engine 132.

At step 206, an image processing process is performed to generate image IDs for the extracted images from the appraisal report, detect image data that includes one or more features of the extracted images, link the submission file attributes associated with the appraisal reports with the image data of the extracted images, and organize the image data and amplifying data into one or more image data tables 115 and summary data tables 116. Details regarding the image processing process of step 206 are discussed further herein.

At step 208, an image duplicate detection process is performed where the duplicate detection engine 148 detects duplicate images that have been previously submitted with other appraisal reports based on the image IDs of the images. The duplicate detection engine 148 can also determine whether the duplicate images are associated with false positive occurrences based on locations of the properties associated with the duplicate images, appraisers submitting the reports, whether the duplicate images are associated with an appraisal resubmission or particular type of image. If the number of non-false positive duplicate images is greater than a predetermined threshold, then the duplicate detection engine 148 can output a duplicate flag. Details regarding the image duplicate detection process are described further herein.

At step 210, an image quality assessment process is performed where the image quality assessment engine 150 determines whether the images submitted with appraisal reports meet the predetermined image quality specifications based on the one or more image quality indices included in the summary tables 116. In some examples, submitters 102 who are attempting to disguise certain problematic aspects of a property may intentionally submit poor quality images that mask the problem aspects. If one or more of the image quality indices are less than a predetermined threshold, then the image quality assessment engine 150 may output a quality flag. Details regarding the image quality assessment process are described further herein.

At step 212, an image modification assessment process is performed where the image modification engine 152 determines whether any of the submitted images have been modified from an original version, which may indicate that the submitter 102 is attempting to cover up an issue with the property. If the number of modified images is greater than a predetermined threshold, then the image modification engine 152 may output a modification flag. Details regarding the image modification assessment process are described further herein.

At step 214, the data management engine 130 outputs information to the submitters 102 and/or reviewers 104 regarding whether or not any image anomalies have been detected. The data management engine 130 can output a report that includes data associated with any of the anomaly flags that may have been generated at steps 208, 210, and 212 of the image anomaly detection process 200. The information that is output to the submitters 102 and/or reviewers 104 can include a total number of duplicate flags, quality flags, and modification flags associated with the submitted appraisal report along with any associated information. For example, if a duplicate flag is generated at step 208, then the report can include information associated with the duplicate image, such as type of appraisal, location of property, appraiser, mortgage lender, image type, as well as the duplicate image itself.

In addition, the report output to the submitters 102 and/or reviewers 104 can also include analysis and recommendations based on the detected image anomalies. For example, if any image anomalies are detected, the report can include a recommendation that the submitter 102 re-perform the appraisal and resubmit another appraisal report. The report can also include recommendations to the reviewers 104 (e.g., potential mortgage purchasers) of whether or not to accept a mortgage, provide mortgage funding, or provide representation and warranty relief to the mortgage lender based on the image anomaly detection results. In some implementations, the information included in the report can also be used as quality control for evaluating the performance of the appraisers who submitting the appraisal reports.

Figure 3:
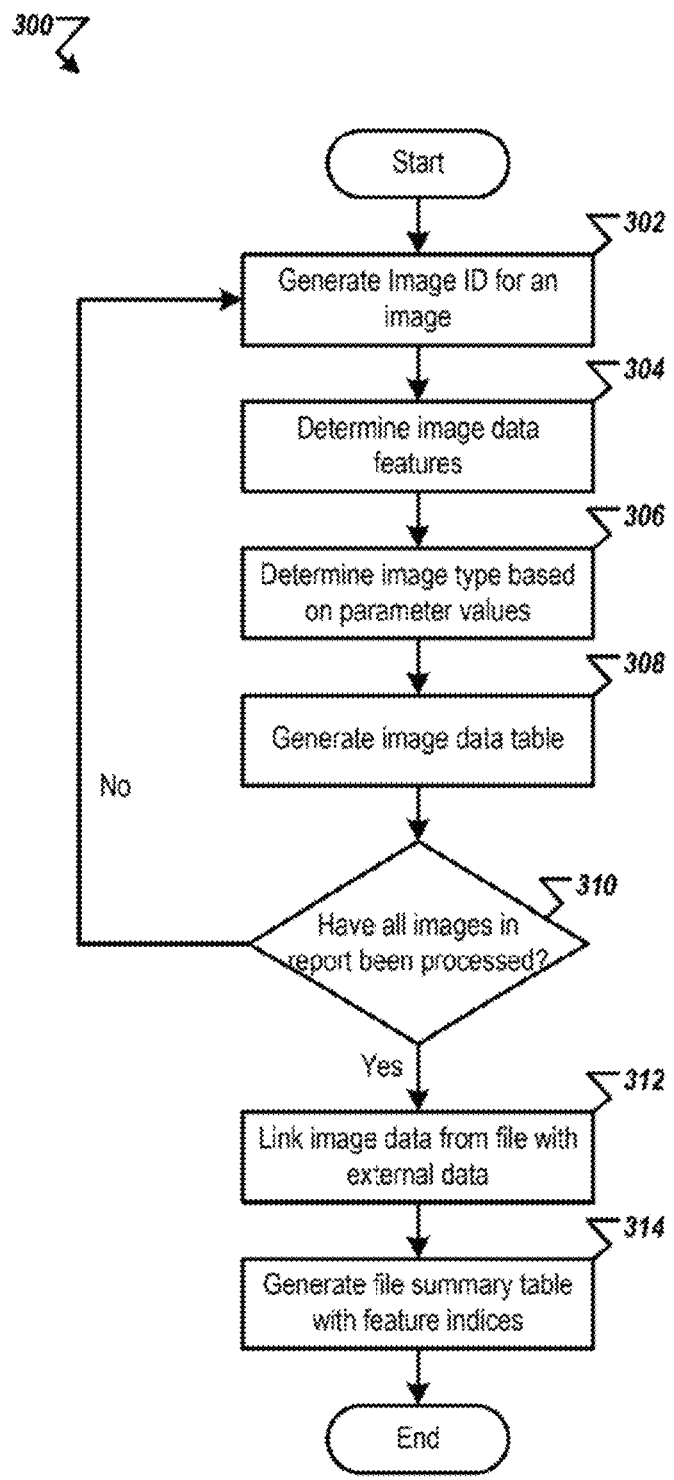
FIG. 3 is an exemplary flowchart of an image processing process.

FIG. 3 is an exemplary flowchart of an image processing process 300, which is an implementation of step 206 of the image anomaly detection process 200. The image processing process 300 is performed by one or more of the processing engines of the image anomaly detection system 108, such as the image ID engine 138, the image processing engine 140, the image type classification engine 142, the data linking engine 144, and the image data organization engine 146.

At step 302, in response to extracting the images from a submitted appraisal report, the image ID engine 138 generates an image ID for an image that characterizes each image based on one or more properties of one or more pixels of the image. In one implementation, the image ID is a multi-digit number that corresponds to brightness values of one or more pixels of an image and is used to detect duplicate images from previously submitted appraisal reports that are included in a submitted appraisal report. In some implementations, features other than brightness values or in addition to brightness values can also be used to generate the image ID, such as image contrast or any other feature. The digits of the image ID can also include other types of characters such as letters or special characters. The number of digits included in the image ID can be based on processing capabilities of the processing circuits associated with the image ID engine 138 as well as a false positive rate associated with a particular number of digits. For example, as the number of digits included in the image ID is increased, the number of false positive detections decreases, but processing efficiency decreases. In one example, the image ID includes eighteen digits, which represent brightness values for nine pixels in three channels (e.g., red, blue, green) of the image. The image ID provides increased processing efficiency for the image anomaly detection system 108 by reducing an amount of processing that is performed in order to detect duplicate images.

Figure 4A:
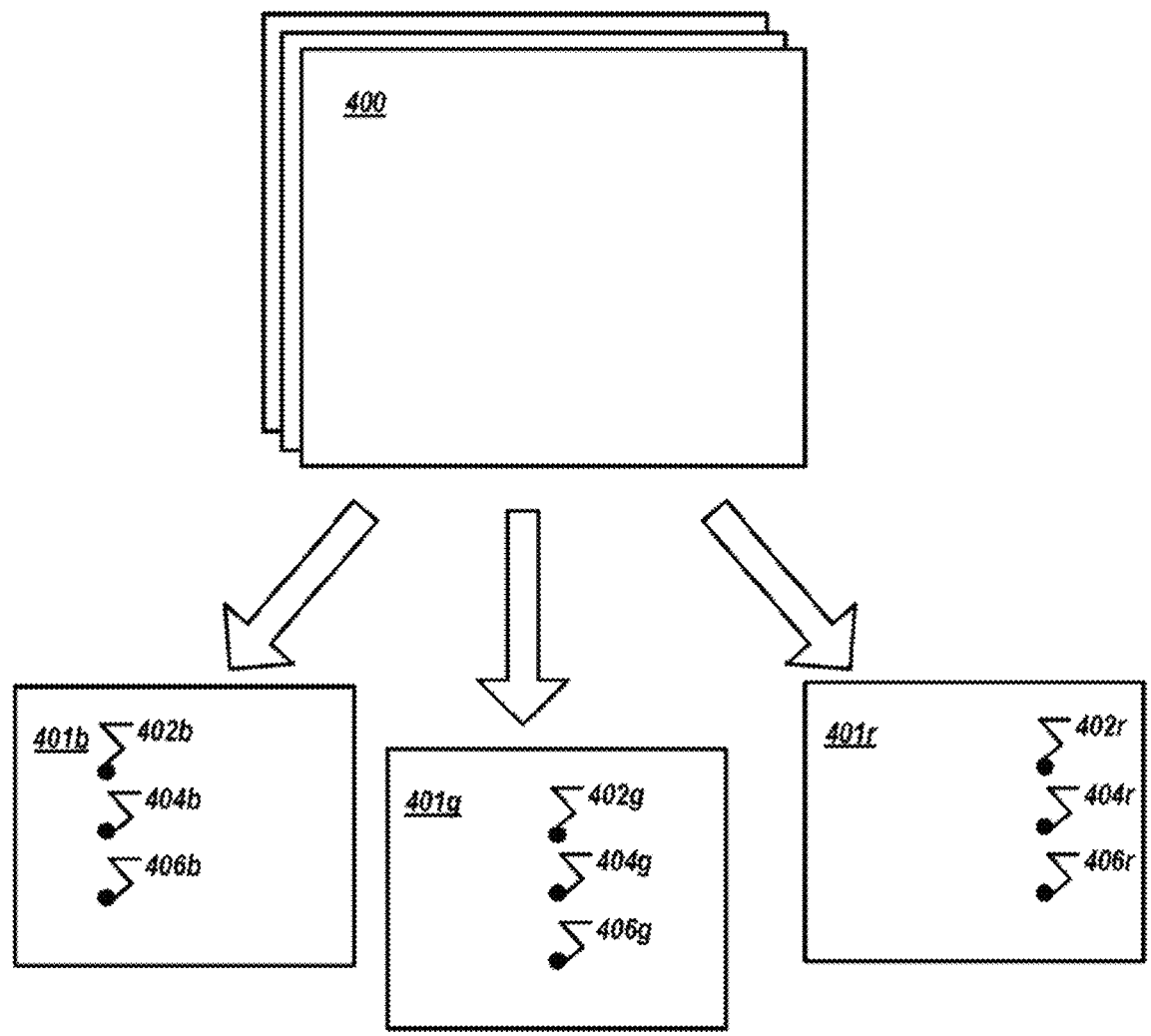
FIG. 4A is an exemplary illustration of an image identification (ID) generation.

FIGS. 4A-4B illustrate how the image ID is generated by the image ID engine 138. For example, FIG. 4A illustrates image 400 that includes three brightness channels 401r, 401g, and 401b that correspond to red, green, and blue brightness channels, respectively. In some implementations, the image ID engine 138 constructs the image ID from brightness values for pixels in each of the brightness channels 401r, 401g, and 401b. For example, the image ID can be constructed from brightness values 402r, 404r, and 406r in the channel 401r, brightness values 402g, 404g, and 406g in the channel 401g, and brightness values 402b, 404b, and 406b in the channel 401r.

In some implementations, the image ID engine 138 selects pixel values at predetermined pixel locations of the image 400 in each of the brightness channels 401r, 401g, and 401b. The predetermined pixel locations may correspond to locations where a probability of variations in brightness level between images is greatest, such as away from outer edges of the image or closer to a center location of the image. For example, in exterior images of a property, pixel brightness values near an upper edge of the image 400 may correspond to sky, which may not have a great amount of variation between images for different properties. However, pixels located near a center portion of the image 400 may represent the structure of the property so there may be more variation in pixel brightness values between various images, which makes occurrences of false positives less likely to happen than if pixel values near the outer edges of the image 400 were selected.

In images where each of the pixels in each channel has a brightness value from 0 to 255 that can be represented by 3 digit values (000 to 255), the image ID engine 138 can use the two least significant digits of the brightness values in the image ID and discards the most significant digit that can only have a value of 0, 1, or 2. For example, for a given brightness value of "186," the image ID engine 138 uses digits "86" as part of the image ID. Therefore, if the two least significant digits of the brightness values for three pixels in each of the brightness channels 401r, 401g, and 401b are used to construct the image ID, then the image ID has eighteen digits. FIG. 4B illustrates a construction of an image ID 410 from the values in each of the brightness channels. For example, the image ID engine 138 can construct the image ID 410 in a predetermined order such as the two least significant digits from pixels 402r, 404r, 406r, 402g, 404g, 406g, 402b, 404b, 406b. However, the predetermined order can include any ordering of the brightness values of the pixels.

Referring back to FIG. 3, at step 304 of the image processing process 300, the image processing engine 140 determines various features associated with an image submitted in an appraisal report that are used to characterize the images, which can be referred to as image data. In some implementations, the features can include image size, average brightness and contrast values for each channel, average smoothness, directionality, and edge ratio values for the image as well as features associated with various regions of the image. The determined image features are used to determine a type of image, whether the images meet predetermined quality standards for appraisal reports, and whether the images have been modified.

At step 306, in response to the detection of the various features of the images by the image processing engine 140, the image type classification engine 142 determines an image type for each image based on at least one of global and regional features (e.g., image size, brightness, contrast, smoothness, directionality, edge ratio) detected by the image processing engine 140. In some implementations, the image type is determined based on supervised machine learning techniques, such as with a neural network that has been trained to detect the image type based on the global and regional features of the image. The image type classification engine 142 can determine a first guess and a second guess for the image type along with corresponding probabilities or amounts of confidence that each image type has been accurately determined. In some implementations, the first guess is the image type that has a highest confidence level, and the second guess is the image type that has a second highest confidence level.

Figure 5:
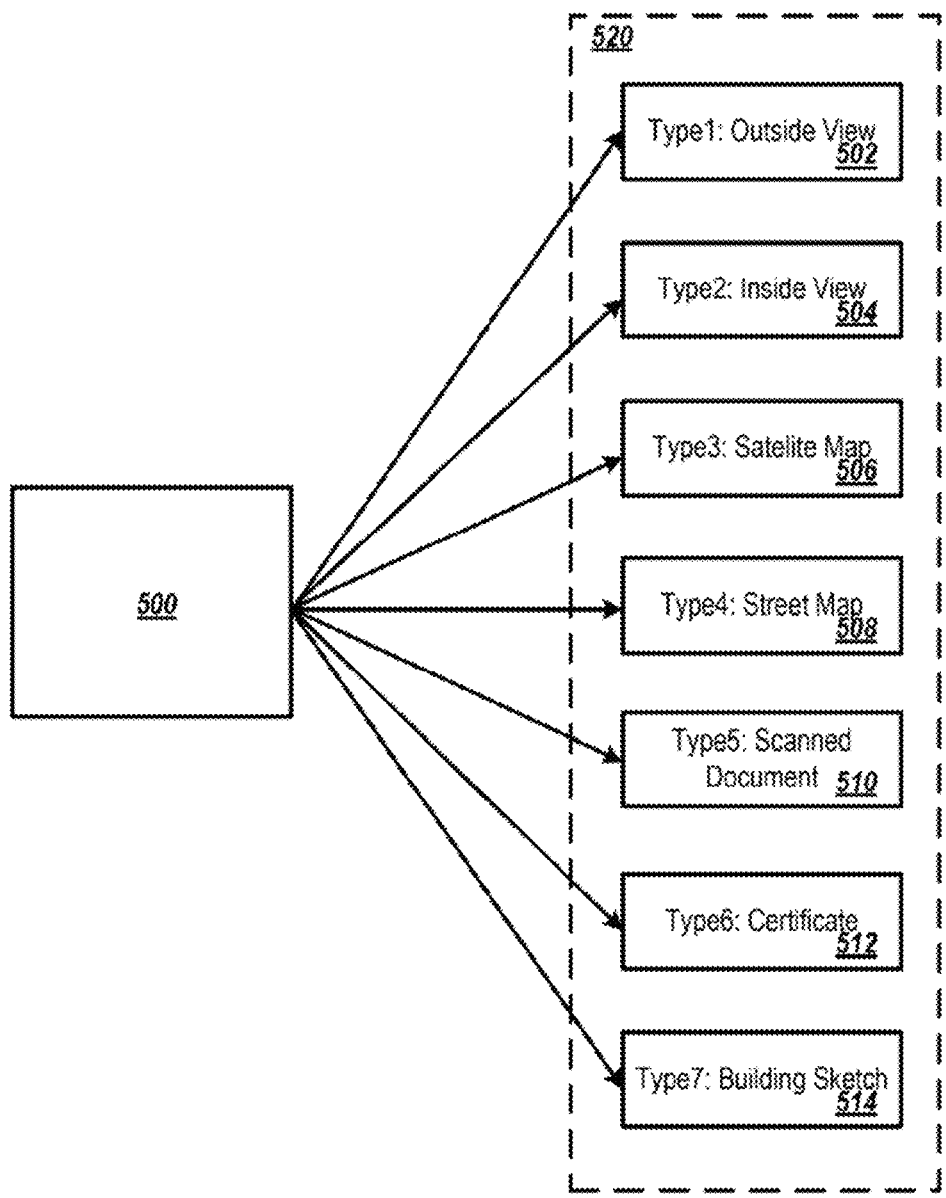
FIG. 5 is an exemplary illustration of image types.

In some implementations, the image type classification engine 142 determines that an image has a type that corresponds to the first guess when a corresponding first guess confidence level is greater than a predetermined threshold. Otherwise, if the first guess confidence level is less than the predetermined threshold, the image type classification engine 142 determines the image type by performing one or more additional image type verification processes. The additional image type verification processes determine the image type based on the first guess and second guess and the corresponding confidence levels, image types of adjacent images in an extracted image sequence, and an overall image type sequence for a submission file. In some examples, images of a submitted appraisal are sequenced by image type, meaning that interior images are grouped together, exterior images are grouped together, and the like. The image type classification engine 142 can use adjacent image type information and image sequence information to further verify that the image type corresponds to the first guess or the second guess. FIG. 5 illustrates the one or more image types to which an image 500 in a submitted appraisal report can be assigned, such as an outside view 502, inside view 504, satellite map 506, street map 508, scanned document 510, certificate 512, building sketch 514, or any other type of image. In some implementations, the image type classification engine 142 uses supervised machine learning techniques to determine the image type, such as via a neural network. In one example, the neural network associated with the image type classification engine 142 may be trained with a set of approximately 13,000 images to achieve a high accuracy of image type classification. It can be understood that increasing the training set size or using various other types of machine learning techniques may result in increased or decreased amounts of accuracy in classifying the images.

Referring back to FIG. 3, at step 308, the image organization engine 146 organizes the features represented by the image data into the image data tables 115, which can include one or more entries for each of the images in a submitted appraisal report that include the image ID, image type, size, brightness, contrast, smoothness, directionality, edge ratio, or regional features. FIG. 6 illustrates an exemplary format for an image data table 600. It is noted that the image data table 600 can include more or less entries. In addition, other features than those illustrated in FIG. 6 can also be included in the image data table 600.

For example, entry #1 corresponds to an image ID 602 and entry #2 corresponds to an image index 604 within a particular appraisal report. For example, if an appraisal includes 15 images, then the image index 604 can have a value from 1 to 15. Entries #3 and #4 correspond to an image type 606 first guess and corresponding probability 608, and entries #5 and #6 correspond to an image type second guess 610 and corresponding probability 612. Entry #7 corresponds to a comparable sale flag 614, which indicates whether the image is associated with a comparable property. The image organization engine 146 can determine the value for the comparable sale flag based on the submission file attributes included in the appraisal report. Entries #8 and #9 correspond to horizontal and vertical pixel lengths of the image, which represent an image size 616. Entries #10-#13 correspond to brightness values 618 that include an average brightness value for the entire image as well as each of the three channels (red, green, blue). Entries #14-#17 correspond to a contrast value 620 that includes an average contrast value for the entire image as well as each of the three channels (red, green, blue). Entry #18 corresponds to an average smoothness value 622 of the image, entry #19 corresponds to an average directionality value 624 of the image, and entry #20 corresponds to an average edge ratio 626 of the image. Entries #21-45 correspond to regional features 628 that include brightness, contrast, smoothness, directionality, and edge ratio for five regions of the image (e.g., four corner regions and one center region).

Referring back to FIG. 3, at step 310, the image organization engine 146 determines whether all of the images associated with the submitted appraisal report have been processed and included in the image data table. If all of the images associated with the submitted appraisal report have been processed, resulting in a "yes" at step 310, then step 312 is performed. Otherwise, if all of the images associated with the submitted appraisal report have not been processed, resulting in a "no" at step 310, then the process returns to step 302 to process another image associated with the appraisal report.

At step 312, the data linking engine 144 links the image data for the images of an appraisal report with the corresponding image data table produced at step 308. For example, the linked data can include the type of appraisal performed, whether the property is vacant or occupied, type of purchase transaction, property condition, quality of construction assessment, quality of construction assessment, number of interior photos, number of exterior photos, number of comparable property images and other types of images, total number of rooms, and other information associated with the property. The linked data can also include additional information provided in comments of the appraisal report that may indicate any particular damage associated with the property.

At step 314, the entries in the included in the image data table along with the linked data are used by the image data organization engine 146 to produce the summary data tables 116. A summary data table is produced for each appraisal report, and the entries of the summary data tables 116 characterize the type of appraisal reports as well as the images included in the appraisal reports. For example, the summary data tables can include entries for a document ID for the appraisal report, an ID for the type of appraisal, occupancy of the property, type of transaction, condition of the property, numbers of exterior, interior, and other types of images, number of rooms, and one or more image quality indices that represent a quality of the images submitted in the report. For example, the image quality indices can include a file completeness index, an image resolution index, an image brightness index, an image contrast index, and a size consistency index.

FIG. 7 illustrates an exemplary format for a summary data table 700. It is noted that the summary data table 700 can include more or less entries than those illustrated in FIG. 7. In addition, other features than those illustrated in FIG. 7 can also be included in the image data table 700. For example, address, zip code, and appraiser name and/or identification number can also be included as entries in the summary data table 700.

In the illustrated example, entry #1 corresponds to a document ID (Doc ID) 702, which is an identification code for the appraisal report. Entry #2 corresponds to a form ID 704, which indicates a type of appraisal. For example, a form ID can indicate whether the appraisal report includes both interior and exterior images, exterior images only, or whether the appraisal report is associated with a resubmission. Entry #3 corresponds to a vacancy type (vacType) 706, which indicates whether the property is vacant or not vacant. In some implementations, the image processing engine 140 can make adjustments to an image contrast index (indexIC) 730 based on whether the appraised property is vacant or not vacant. For example, interior images of vacant properties typically have lower image contrast values than contrast values of occupied properties because vacant properties may have fewer objects in the image (e.g., furniture), which can reduce an amount of variation in the image as well as image contrast.

Entry #4 corresponds to a purchase type (purType) 708, which indicates a type of purchase transaction associated with the appraisal report (e.g., purchase transaction, refinance transaction, or any other type of transaction). Entry #5 corresponds to a property condition (condType) 710, which indicates whether the property is existing, proposed, or new construction. Entry #6 corresponds to a quality of a construction assessment (qNum) 712, which indicates on a scale of 1 to 6 the quality of a construction assessment. Entry #7 corresponds to a property condition assessment score (cNum) 714 on a scale of 1 to 6. Entry #8 corresponds to a total number of interior images 716 included in the appraisal report, entry #9 corresponds to a total number of exterior images 718 included in the appraisal report, entry #10 corresponds to a total number of comparable property images 720 included in the appraisal report, and entries #11-15 correspond to numbers of other types of images 722 included in the appraisal report (e.g., satellite maps, street maps, scanned documents, certificates, sketches). In addition, entry #25 corresponds to a number of rooms 734 of the property associated with the appraisal report.

Entries 16-24 of the summary data table 700 are quality indices determined by the image organization engine 146 that can include a file completeness index (indexFC) 724, an image resolution index (indexIR) 726, an image brightness index (indexIB) 728, an image contrast index (indexIC) 730, and a size consistency index (indexSC) 732. In some implementations, the quality indices 724, 726, 728, 730, and 732 can be determined based on values of the entries in the image data table 600 as well as values of the entries 704-722 and 734 of the summary data table 800. For example, the file completeness index 724 may be based on the number of rooms 734 of the property and the formID 804 of the appraisal report. In addition, the image data organization engine 146 may weigh certain types of images more heavily than others when calculating the image quality indices. For example, interior images may be weighted more heavily than exterior images or any other types of images when determining one or more of the quality indices 724, 726, 728, 730, and 732.

The quality indices 724, 726, 728, 730, and 732 can be used by the image quality assessment engine 150 to determine whether or not the images submitted in the appraisal report meet predetermined quality specifications. In some implementations, the quality indices 724, 726, 728, 730, and 732 have values from 0 to 5, where values of 0 and 1 represent poor quality photos, and values of 2-5 represent acceptable to excellent quality photos, but other rating scales can also be used. In one example, based on the predetermined quality specifications, the image quality assessment engine 150 may generate a quality flag when more than a predetermined number of images associated with the submitted appraisal report have a score of 0 or 1 or a combined score reaches a predetermined threshold.

The image data organization engine 146 calculates the file completeness index (indexFC) 724 that indicates an amount of correspondence between a number and type of images submitted with the appraisal report and predetermined appraisal report standards included in the report specification data 128. In some examples, submitters 102 may include only a few images in the appraisal report submission in order to mask issues with the property. In some implementations, the indexFC 724 is based on numbers of the types of images submitted with the appraisal report as well as expected numbers of the types of images based on the type of appraisal report (form ID 806), and number of rooms 734 of the property. For example, for an appraisal report that includes both interior and exterior images, the image data organization engine 146 can determine an expected number of interior images, exterior images, comparable property images, satellite map images, scanned document images, and certificate images based on the number of rooms 734 of the property. In one example, an expected number of interior images corresponds to the number of rooms 734 multiplied by 1.5. For example, for a house that has ten rooms, an appraisal report that includes fifteen interior images corresponds to a complete file with respect to the interior images. In some implementations, some types of images are weighted more heavily in the calculation of the file completeness index (indexFC) 724. For example, interior images may be weighted more heavily than exterior images.

The image data organization engine 146 also calculates the image resolution index (indexIR) 726 for the appraisal report that indicates an amount of correspondence between the resolution of the images submitted with the appraisal report and predetermined image resolution specifications included the report specification data 128 that may be submitted by the reviewers 104. For each photo submitted with the appraisal report, the image organization engine 146 calculates a photo index on a scale from 0 to 5 based on a number of pixels of the submitted image and a standard number of pixels associated with the predetermined image resolution standards, such as 200 k pixels according to one example.

Figure 8:
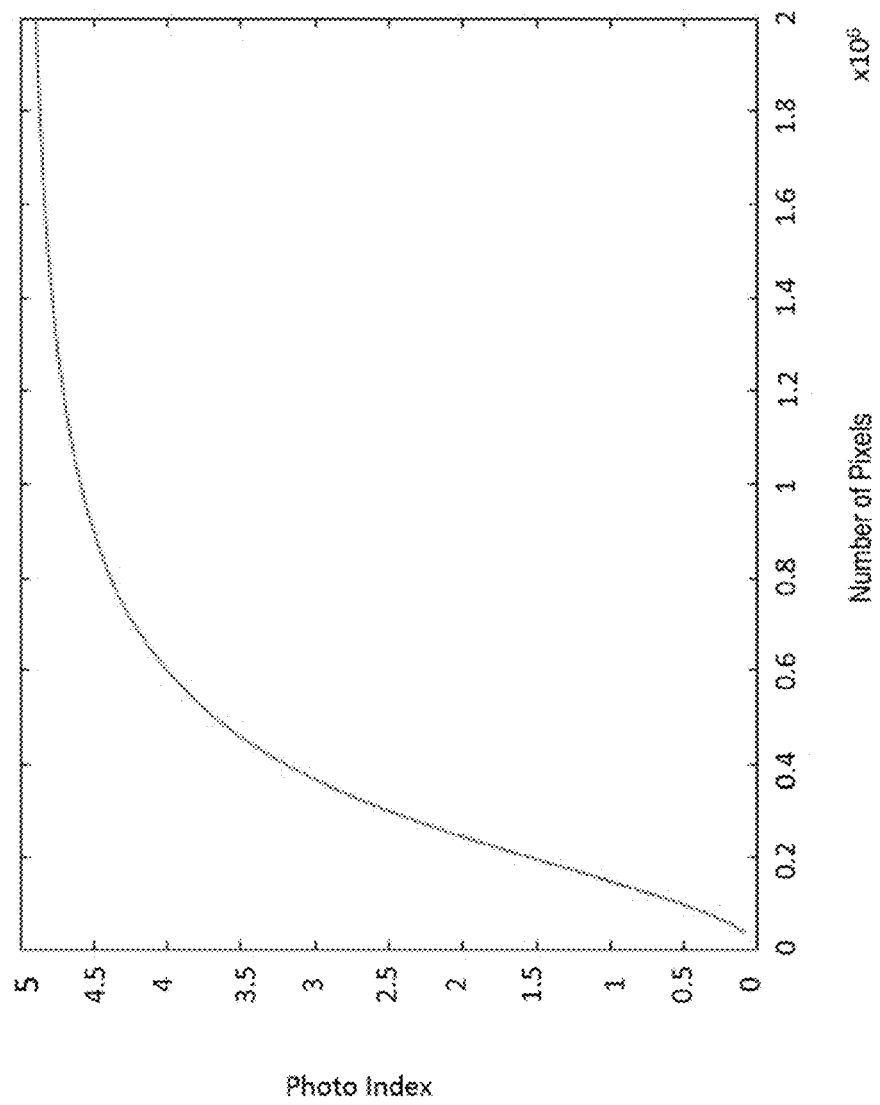
FIG. 8 is an exemplary graph illustrating number of pixels versus photo index value.

FIG. 8 is an exemplary graph 800 of photo indices that correspond to various image sizes in number of pixels. As is shown in the graph 800, for image resolutions of greater than approximately 500 k pixels, a slope of a photo index curve increases more gradually than for lower image resolutions. Image resolutions of less than approximately 200 k pixels have corresponding photo index values of less than or equal to 1, which indicates poor image quality. In one example, to determine the indexIR 726 for an entire appraisal report, the image data organization engine 146 sorts the calculated photo index values from lowest photo index to highest photo index and separates the photo index values evenly into three groups where a first group includes highest photo index values, a second group includes lowest photo index values, and a third group includes photo index values between the first group and the second group, which can be referred to as middle photo index values. The image data organization engine 146 calculates the image resolution index (indexIR) 726 as an average of the middle photo index values. The image data organization engine 146 can also calculate the image resolution index (indexIR) 726 in other ways, such as by taking an average of the photo index values for all of the images submitted with the report. In some implementations, the image resolution index (indexIR) 726 is taken as an average of the middle photo index values because some appraisal reports include images that have been zoomed in on various features of the property in order to highlight various issues or details and may have lower image resolutions. By taking the average of the middle photo index values, the zoomed in images having a lower resolution may not affect the image resolution index (indexIR) 726. Further, the image data organization engine 146 can dynamically updated the calculation based on specific information received from reviewer 104 in the report specification data 128. This allows the image anomaly detection system 108 to adapt to potential future standards.

Referring back to FIG. 7, the image data organization engine 146 calculates the image brightness index (indexIB) 728 that indicates an amount of correspondence between an amount of brightness of the interior images submitted with the appraisal report and predetermined brightness thresholds included in the report specification data 128. In some implementations, brightness values for images that are less than 65 or greater than 190 may correspond to poor quality images based on human perception, and upper and lower brightness thresholds can be included in the report specification data 128 submitted by the reviewers 104. The image brightness index (indexIB) 728 can be calculated based on a number of interior images that are less than a lower brightness threshold or greater than an upper brightness threshold and a total number of submitted interior images and normalized to a scale from 0 to 5. In some implementations, the data organization engine 146 can also use other image types in addition to the interior image types, and the interior image types can be weighted more heavily than any of the other image types when determining the image brightness index (indexIB) 728.

The image data organization engine 146 also calculates the image contrast index (indexIC) 730 that indicates an amount of contrast of the interior images submitted with the appraisal report. In some implementations, contrast values for images that are less than 27 or greater than 80 may correspond to poor quality images based on human perception, and upper and lower contrast thresholds can be included in the report specification data 128 submitted by the reviewers 104. The image contrast index (indexSC) 730 can be calculated based on a number of interior images that are less than a lower contrast threshold or greater than an upper contrast threshold and a total number of submitted interior images and normalized to a scale from 0 to 5. In some implementations, the data organization engine 146 can also use other image types in addition to the interior image types, and the interior image types can be weighted more heavily than any of the other image types when determining the image contrast index (indexIB) 730.

The image data organization engine 146 also calculates the size consistency index (indexSC) 732 that indicates an amount of consistency between image sizes of the images submitted with the appraisal report. In some implementations, images submitted with appraisal reports that have varying sizes can indicate that the submitter 102 has modified the images from an original form. In some examples, the image data organization engine 146 calculates the size consistency index (indexSC) 732 based on a number of unique image sizes for the submitted images, where submitted appraisal reports having a greater numbers of unique image sizes are assigned lower size consistency index values. The size consistency index (indexSC) 732 can be fine-tuned by processing images taken at various amounts of magnification and zoom from the same camera without decreasing a value of the size consistency index (indexSC) 732. In some implementations, the size consistency index calculation also includes an adjustment factor that allows for some variation in image size between the images. In one example, for every ten images submitted with the appraisal report, the adjustment factor provides for one additional unique image size to be detected without reducing the value of the size consistency index (indexSC) 732. Details regarding the use of the size consistence index (indexSC) are described further herein.

Figure 9A:
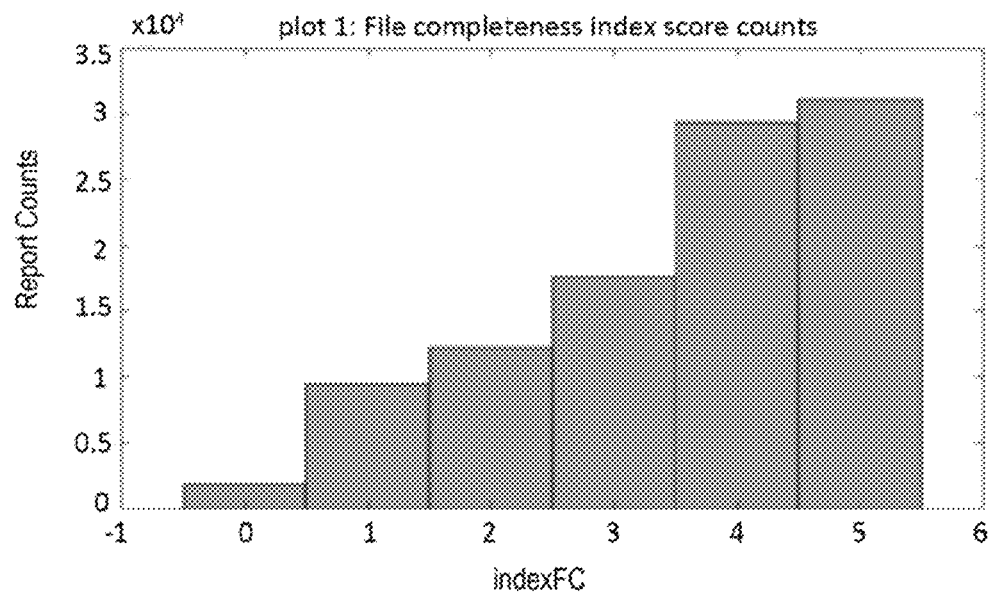
FIG. 9A is an exemplary bar graph illustrating file completeness index results.
Figure 9B:
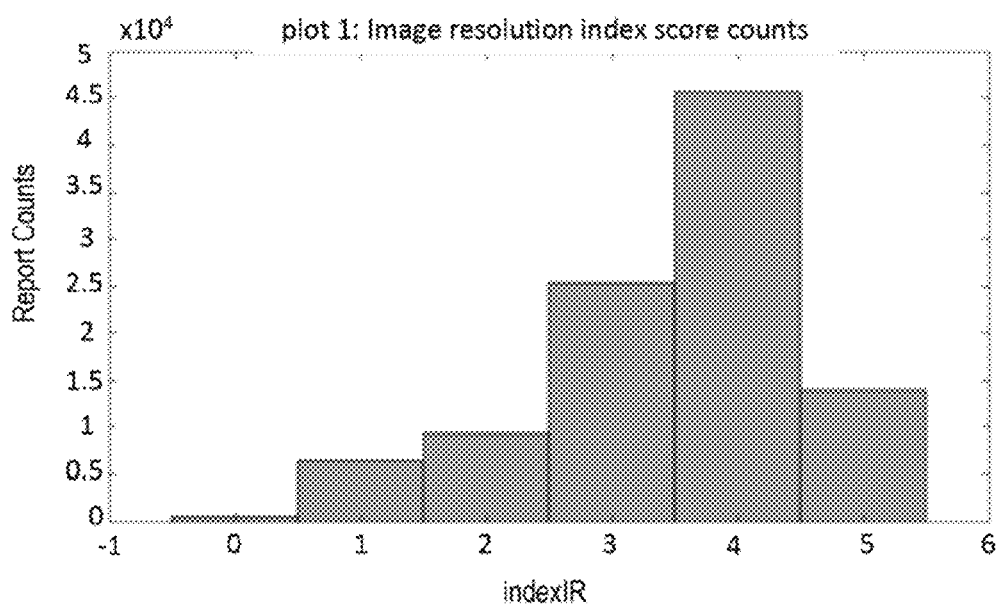
FIG. 9B is an exemplary bar graph illustrating image resolution index results.
Figure 9C:
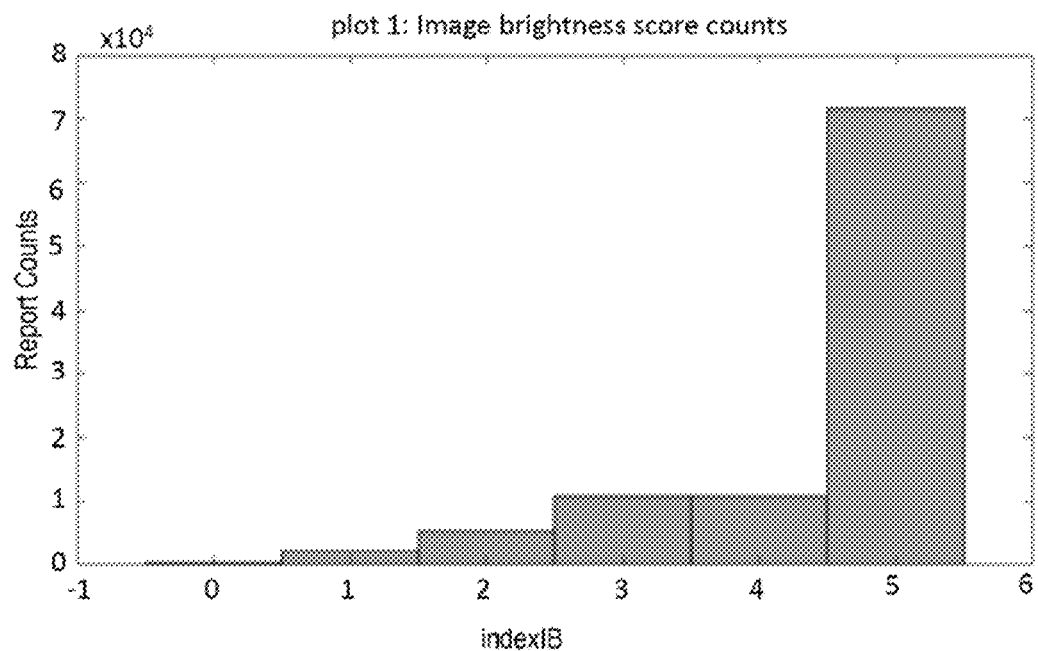
FIG. 9C is an exemplary bar graph illustrating image brightness index results.
Figure 9D:
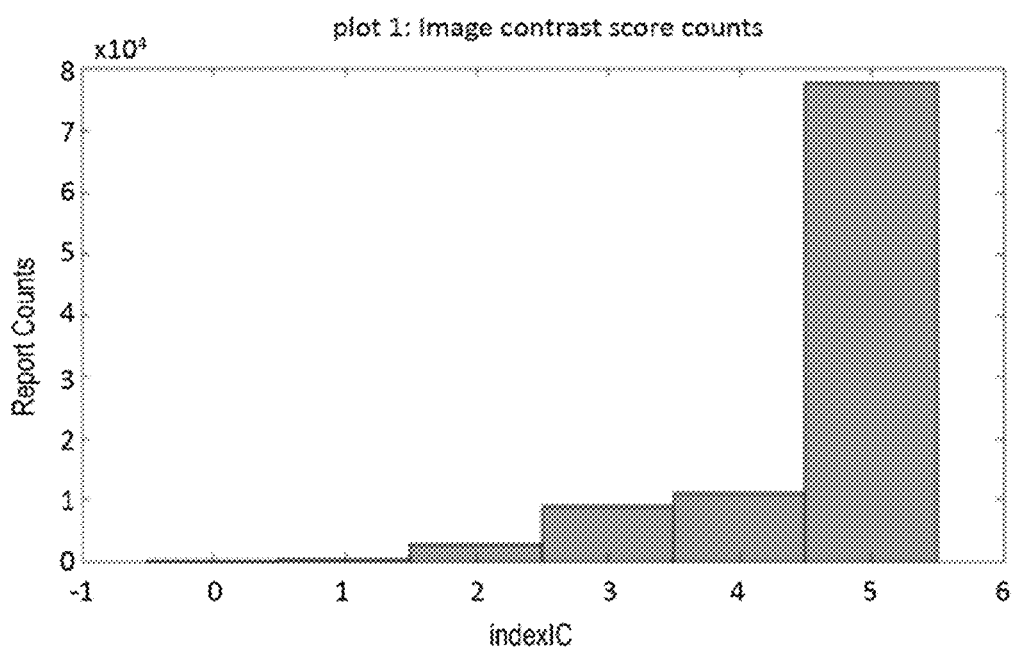
FIG. 9D is an exemplary bar graph illustrating image contrast index results.
Figure 9E:
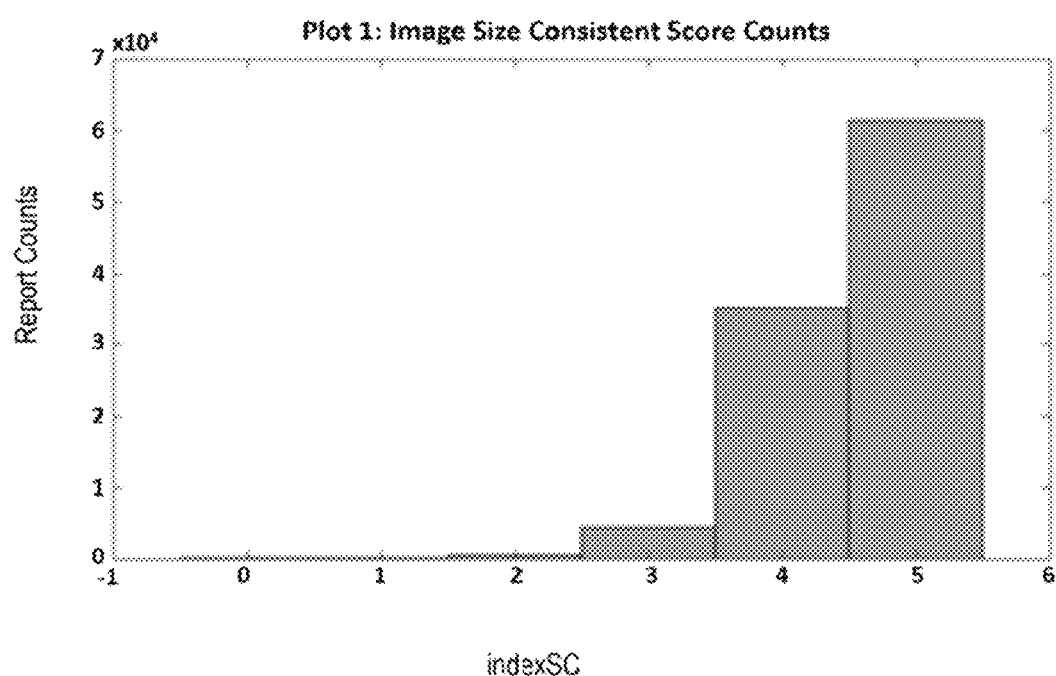
FIG. 9E is an exemplary bar graph illustrating size consistency index results.

FIGS. 9A-9E are exemplary bar graphs that illustrate image quality indices for 100,000 submitted appraisal reports. For example, FIG. 9A illustrates report counts for the file completeness index (indexFC) 724. FIG. 9B illustrates report counts for the image resolution index (indexIR) 726. FIG. 9C illustrates report counts for the image brightness index (indexIB) 728. FIG. 9D illustrates report counts for the image contrast index (indexSC) 730. FIG. 9E illustrates report counts for the size consistency index (indexSC) 732. As can be seen from the graphs, most of the image quality indices for the submitted appraisal reports have values between 2 and 5, which can indicate that the image quality indices of 0 or 1 are lower than a majority of the image quality indices for other appraisal report submissions.

Figure 10:
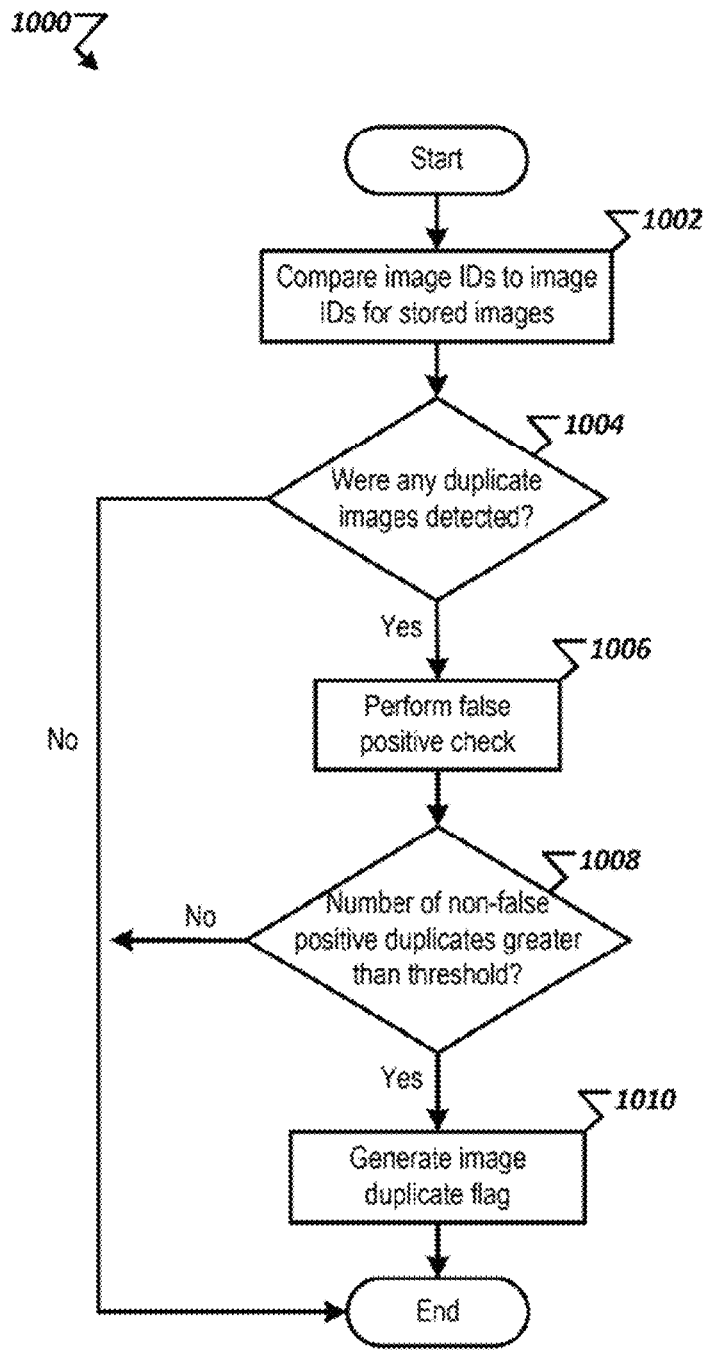
FIG. 10 is an exemplary flowchart of an image duplicate detection process.

FIG. 10 is an exemplary flowchart of an image duplicate detection process 1000, which is an implementation of step 208 of the image anomaly detection process 200. The image duplicate detection process 1000 is controlled by the duplicate detection engine 148, which interacts with the other processing engines of the image anomaly detection system 108 to detect duplicates between the images submitted with an appraisal report another previously submitted images. In some implementations, submitters 102 may intentionally or unintentionally submit images associated with other properties with an appraisal report, which can be detected by the duplicate detection engine 148.

At step 1002, the duplicate detection engine 148 compares the image IDs from the image data table for a submitted appraisal report with the image IDs from the image data tables 115 stored in the data repository in order to detect any duplicate images. Performing the image comparison based on image ID rather than comparing individual pixel values of images greatly reduces a processing burden on the duplicate detection engine 148. In some implementations, the duplicate detection engine 148 can selectively or preferentially compare the image data table for the submitted appraisal report with the image data tables 115 stored in the data repository 114 based on one or more entries or information associated with the image data tables 115 or corresponding summary data tables 116. For example, the duplicate data engine 148 can prioritize the image ID comparison with images associated with at least one of properties within a predetermined distance of the property associated with the submitted appraisal report, properties associated with a particular appraiser, and properties associated with an employer of the particular appraiser. This further reduces processing time thereby enhancing efficiency while also removing appraisals that likely aren't applicable for comparison to a specific appraisal.

In some implementations, the duplicate detection engine 148 detects an image duplicate when two image IDs are identical (also referred to as matching image IDs). The duplicate detection engine 148 can also detect duplicates even when the brightness levels of the image have all been modified by a predetermined amount, which may occur in instances where a submitter 102 is attempting to subvert the image anomaly detection system 108 by modifying the brightness values of an image by an amount that may be undetectable to a human eye. For example, if a submitter 102 increases all of the brightness values of a duplicate image used in an appraisal report by a value of 1, then the image ID for the modified duplicate image may not be identical to the duplicate image. The duplicate detection engine 148 can detect image duplicates when an average difference in brightness values for pixels included in the image ID is less than a predetermined threshold. The duplicate detection engine 148 can also detect duplicate images by normalizing a brightness value to a predetermined brightness level for an image before generating the image ID at step 302 of the image processing process 300.

At step 1004, the duplicate detection engine 148 determines whether any duplicate images were detected at step 1002, if one or more duplicate images were detected resulting in a "yes" at step 1004, then step 1006 is performed. Otherwise, if no duplicate images were detected, resulting in a "no" at step 1004, then the duplicate detection process 1000 is terminated.

At step 1006, the duplicate detection engine 148 performs a false positive check if any duplicate images were detected at step 1004 and dismiss any detected false positive duplicate images. The false positive check can include detecting occurrences of duplicate images that may not correspond to errors or fraudulent activity. In some implementations, the duplicate detection engine 148 determines that the duplicate images are false positives if one or more false positive conditions are met. For example, resubmission appraisal reports for a property may include images that are duplicates of images included in a previously submitted version of the appraisal report if an amount of time between report submissions is less than a predetermined threshold, such as 3 months or six months. In addition, the report specification data 128 may indicate certain types of allowable duplicate image submissions, such as certificates or comparable property exterior images. The duplicate detection engine 148 can also detect false positive duplicates based on other false positive conditions based on distance between properties associated with the duplicate images, identification information associated with the submitters 102 of the reports, mortgage lenders associated with the submitters 102 of the reports, and information of the submitters of the reports themselves.

At step 1008, the duplicate detection engine 148 determines whether a number of non-false positive duplicate images is greater than a predetermined duplicate threshold. In some implementations, the predetermined duplicate threshold may be set at zero or may be greater than zero to account for allowable duplicate images such as certificates, comparable property exterior images, and the like. If the number of non-false positive duplicate images is greater than the predetermined duplicate threshold, resulting in a "yes" at step 1008, then step 1010 is performed. Otherwise, if the number of non-false positive duplicate images is less than or equal to the predetermined duplicate threshold, resulting in a "no" at step 1008, then the duplicate detection process 1000 is terminated.

At step 1010, if the number of detected non-false positive duplicate images is greater than the predetermined threshold, then the duplicate detection engine 148 generates an image duplicate flag, which is stored in the data repository as duplicate flag data 118. In some implementations, the duplicate flag data 118 can include the number of duplicate images detected in an appraisal report, type of appraisal, location of property, appraiser, mortgage lender, image types, as well as the duplicate images.

Figure 11:
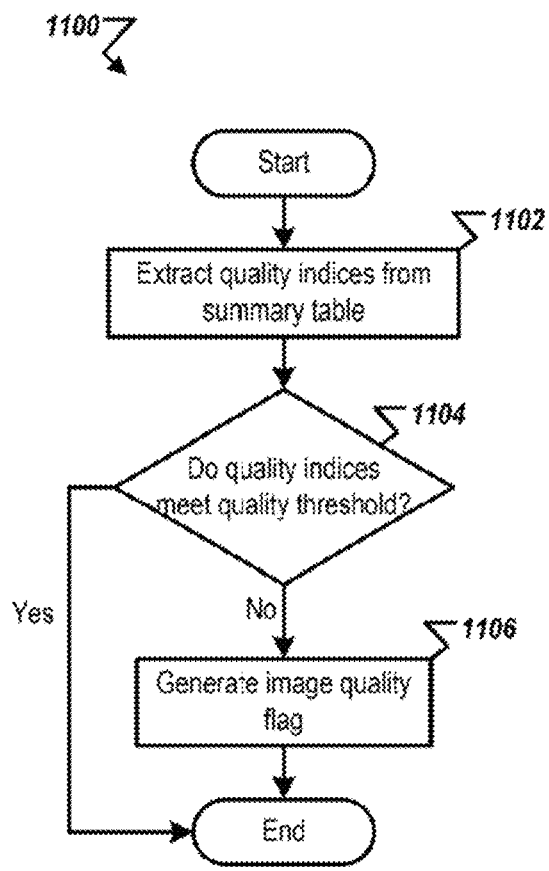
FIG. 11 is an exemplary flowchart of an image quality assessment process.

FIG. 11 is an exemplary flowchart of an image quality assessment process 1100, which is an implementation of step 210 of the image anomaly detection process 200. The image quality assessment process 1100 is controlled by the image quality assessment engine 150, which interacts with the other processing engines of the image anomaly detection system 108 to detect appraisal report submissions that are less than image quality specifications included in the report specification data 128. In some implementations, submitters 102 may unintentionally or intentionally submit images associated that have a degraded quality in order to mask issues with the property, which can be detected by the image quality assessment engine 150.

At step 1102, the image quality assessment engine 150 extracts the image quality indices from the image summary table for the submitted appraisal report. For example, the image quality assessment engine 150 can assess the quality of the images submitted in the appraisal report based on at least one of the file completeness index 724, image resolution index, image brightness index 728, image contrast index 730, and size consistency index 732.

At step 1104, the image quality assessment engine 150 determines whether the image quality indices for the submitted appraisal report meet quality thresholds for each of the indices. In some implementations, the images quality thresholds correspond to image quality values of 2 on a scale from 0 to 5, meaning that the image quality indices meet quality thresholds when each of the image quality indices is greater than 2. However, in some implementations, the image quality thresholds can be met when all of the image quality indices except one or two indices are greater than two. In addition, some image quality indices may have different image quality thresholds. If it is determined at step 1104 that the image quality indices for the submitted appraisal report meet the quality thresholds, resulting in a "yes" at step 1104, then the image quality assessment process 1100 is terminated. Otherwise, if it is determined that the image quality indices for the submitted appraisal report do not meet the quality thresholds, resulting in a "no" at step 1104, then step 1106 is performed.

At step 1106, if the image quality indices for the submitted appraisal report do not meet the quality thresholds, then the image quality assessment engine 150 generates an image quality flag, which is stored in the data repository as quality flag data 120. In some implementations, the quality flag data 120 can include information regarding the quality deficiencies detected in the appraisal report, type of appraisal, location of property, appraiser, mortgage lender, image types, and other information associated with the appraisal report.

Figure 12:
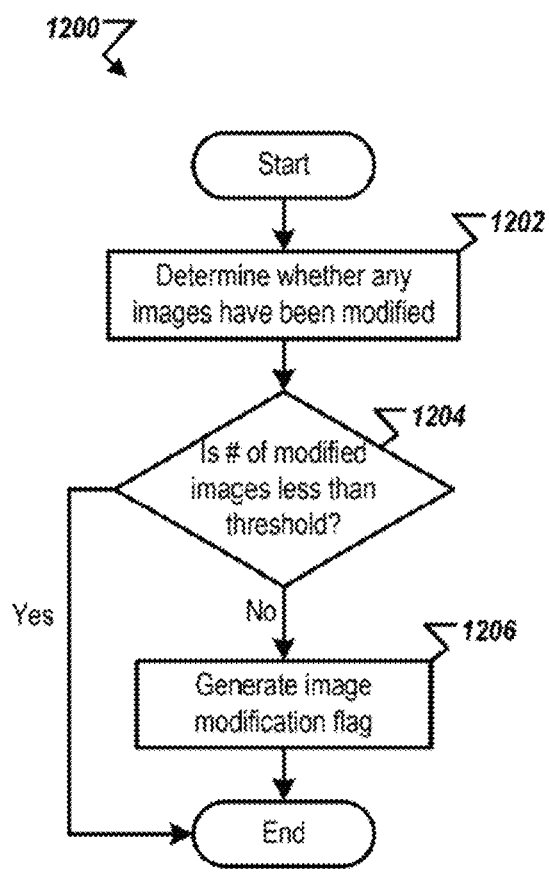
FIG. 12 is an exemplary flowchart of an image modification assessment process.

FIG. 12 is an exemplary flowchart of an image modification assessment process 1200, which is an implementation of step 212 of the image anomaly detection process 200. The image modification assessment process 1200 is controlled by the image modification assessment engine 152, which interacts with the other processing engines of the image anomaly detection system 108 to detect occurrences of when images included in the appraisal reports have been modified from an original version. In some implementations, submitters 102 may unintentionally or intentionally submit images associated that have been modified in order to mask issues with the property, which can be detected by the image modification assessment engine 152. In some implementations, the image modification assessment process 1200 can be combined with the execution of the image quality assessment process 1100.

At step 1202, the image modification assessment engine 152 determines whether any images in the submitted appraisal report have been modified from an original version based on the values of the entries of the image data table and summary data table. In some implementations, image quality index values that are less than a threshold of 2 (e.g., 0 or 1) for any of the image quality indices may be an indicator that one or more of the images have been modified from an original version. For example, the size consistency index 732 of 0 or 1 may be an indicator that the submitter 102 has cropped out portions of one or more submitted images, which produces variations in size between the submitted images. In one example, for any image quality index value of 0 or 1, the image modification assessment engine 152 further processes the images for the submitted appraisal report to determine the one or more images that are contributing to the reduced quality index value. For a size consistency index value of 0 or 1, the image modification assessment engine 152 can determine which of the images may have been modified based on variations in the image sizes of the images in the appraisal report. For example, for an appraisal report that includes a total of twenty images, and fifteen of the images have a first image size, and the five remaining images each have an image size that does not equal the first image size, then the image modification assessment engine 152 may determine that the five remaining images have been modified.

In some implementations, the image modification assessment engine 152 can also detect image modifications when the brightness levels of the image have all been modified by a predetermined amount, which may occur in instances where a submitter 102 is attempting to subvert the image anomaly detection system 108 by modifying the brightness values of an image by an amount that may be undetectable to a human eye. For example, if a submitter 102 increases all of the brightness values of a duplicate image used in an appraisal report by a value of 1, then the image ID for the modified duplicate image may not be identical to the duplicate image. The image modification assessment engine 152 can detect image modifications when an average difference in brightness values for pixels included in the image ID is less than a predetermined threshold.

Another way the image modification assessment engine 152 can detect image modifications is by performing an analysis of image compression throughout an image. In some implementations, the image modification assessment engine 152 determines that an image has been modified from an original version when different regions of the image have been compressed by varied amounts.

At step 1204, the image modification engine determines whether a number of modified images submitted with the appraisal report is less than an image modification threshold. If the number of modified images is less than the image modification threshold, resulting in a "yes" at step 1204, then the image modification assessment process 1200 is terminated. Otherwise, if the number of modified images is greater than or equal to the image modification threshold, resulting in a "no" at step 1204, then step 1206 is performed.

At step 1206, if the number of modified images is greater than or equal to the image modification threshold, then the image quality assessment engine 150 generates an image modification flag, which is stored in the data repository as modification flag data 122. In some implementations, the modification flag data 122 can include information regarding the modified images that have been detected in the appraisal report, type of appraisal, location of property, appraiser, mortgage lender, image types, or any other information associated with the modification flag data 122.

FIG. 13 is an exemplary illustration of an image anomaly report 1300 that can be output to the submitters 102 and/or reviewers 104 and/or external sources 106 at step 214 of the image anomaly detection process (FIG. 2) that reflects the results of the image duplicate detection process 1000 (FIG. 10), the image quality assessment process 1100 (FIG. 11), and the image modification assessment process 1200 (FIG. 12). The information that is output in the image anomaly report 1300 can include one or more data fields that contain information related to the type of appraisal as well as information associated with any duplicate flag data 118, quality flag data 120, or modification flag data 122 associated with the appraisal. For example, the report 1300 can include an appraisal information data field 1302, a detected duplicate image data field 1304, an image quality issue data field 1306, an image modification data field 1308, and a recommendation data field 1310.

The appraisal information data field 1302 can include information associated with the appraisal such as appraisal type, appraiser identification information, mortgage type, address, inspection time, or type of dwelling. The duplicate image data field 1304 can indicate whether or not any duplicate images have been detected, an amount of detected duplicate images, and additional information that can include duplicate image types and representations of the images. The image quality issue data field 1306 can indicate whether any image quality flags have been generated associated with at least one of the file completeness index, image resolution index, image brightness index, image contrast index, and size consistency index. The image modification data field 1308 can indicate whether or not any modified images were detected and if the number of modified images that are detected are within predetermined size consistency standards included in the report specification data 128.

In addition, the report 1300 can also include analysis and recommendations 1310 based on the detected image anomalies. For example, if any image anomalies are detected, the report can include a recommendation that the submitter 102 re-perform the appraisal and resubmit another appraisal report. The report can also include recommendations to the reviewers 104 (e.g., potential mortgage purchasers) of whether or not to accept a mortgage, provide mortgage funding, or provide representation and warranty relief to the mortgage lender based on the image anomaly detection results. In some implementations, the information included in the report can also be used as quality control for evaluating the performance of the appraisers who submitted the appraisal reports. For example, the information provided in the report can be used in quality control procedures to identify high risk loans based on the identified characteristics of the images in the submitted appraisal reports.

Figure 14A:
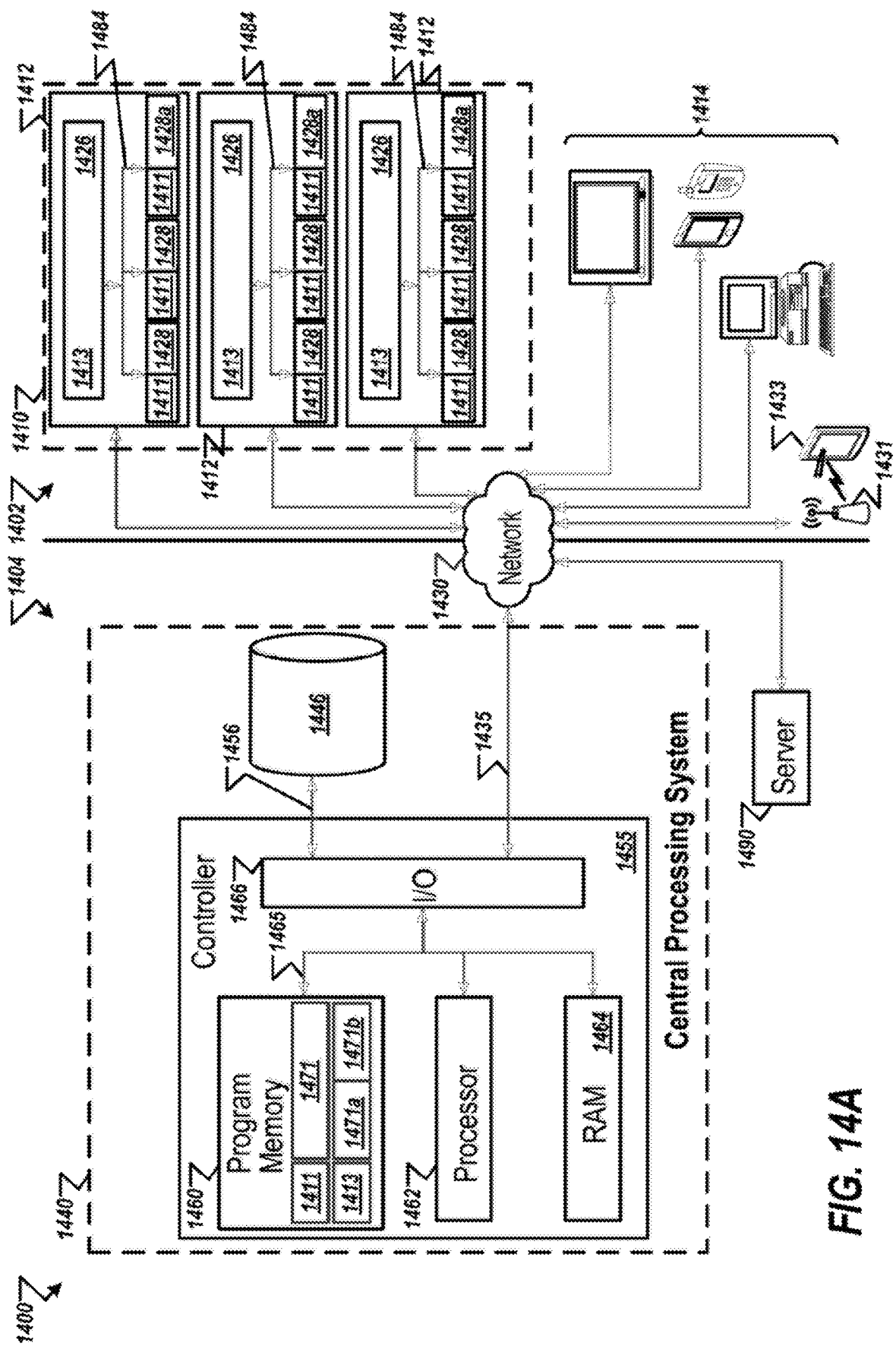
FIGS. 14A and 14B illustrate various aspects of an exemplary architecture implementing a platform for image anomaly detection.
Figure 14B:
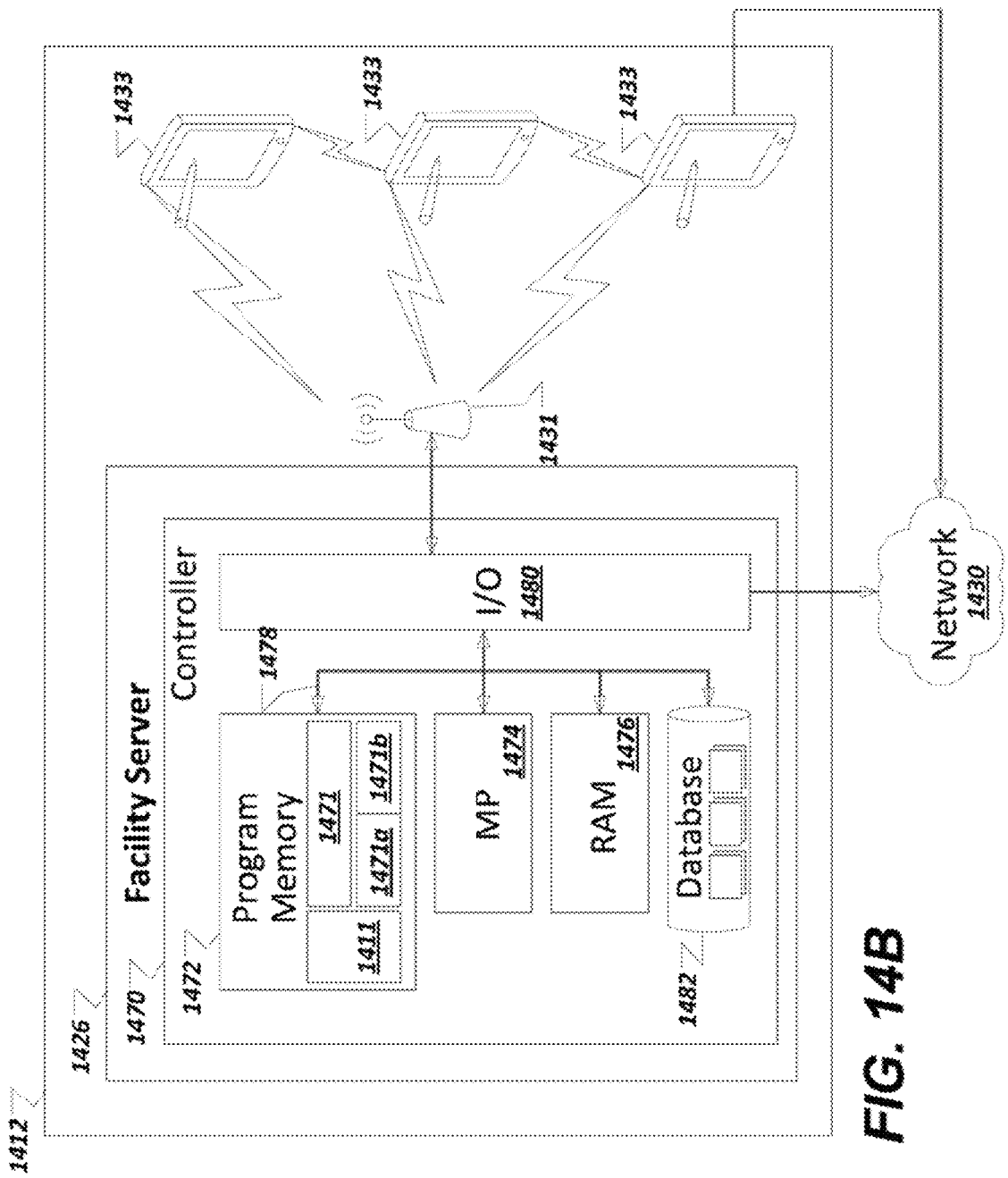

FIGS. 14A and 14B illustrate various aspects of an exemplary architecture implementing a platform 1400 for detecting image anomalies. The high-level architecture includes both hardware and software applications, as well as various data communications channels for communicating data between the various hardware and software components. The platform 1400 may be roughly divided into front-end components 1402 and back-end components 1404. The front-end components 1402 are primarily disposed within a submitter or reviewer network 1410 including one or more submitters or reviewers 1412. The submitters or reviewers 1412 may be located, by way of example rather than limitation, in separate geographic locations from each other, including different areas of the same city, different cities, different states, or even different countries. The front-end components 1402 may include a number of workstations 1428. The workstations 1428, for example, can be local computers located in the various locations 1412 throughout the network 1410 and executing various applications for detecting image anomalies.

Web-enabled devices 1414 (e.g., personal computers, tablets, cellular phones, smart phones, web-enabled televisions, etc.) may be communicatively connected to locations 1412 and the system 1440 through a digital network 1430 or a wireless router 1431, as described below.

Referring now to FIG. 14A, the front-end components 1402, in some embodiments, include a number of facility servers 1426 disposed at the number of locations 1412 instead of, or in addition to, a number of workstations 1428.

Each of the locations 1412 may include one or more facility servers 1426 that may facilitate communications between the web-enabled devices 1414 and the back-end components 1404 via a digital network 1430, described below, and between the terminals 1428, 1428A of the locations 1412 via the digital network 1430, and may store information for a number of submitters/approvers/accounts/etc. associated with each facility. Of course, a local digital network 1484 may also operatively connect each of the workstations 1428 to the facility server 1426. Unless otherwise indicated, any discussion of the workstations 1428 also refers to the facility servers 1426, and vice versa. Moreover, environments other than the locations 1412, such as the kiosks, call centers, and Internet interface terminals may employ the workstations 1428, the web-enabled devices 1414, and the servers 1426. As used herein, the term "location" refers to any of these points of contact (e.g., call centers, kiosks, Internet interface terminals, etc.) in addition to the locations 1412, etc. described above.

The front-end components 1402 communicate with the back-end components 1404 via the digital network 1430. One or more of the front-end components 1402 may be excluded from communication with the back-end components 1404 by configuration or by limiting access due to security concerns. For example, the web enabled devices 1414 may be excluded from direct access to the back-end components 1404. In some embodiments, the locations 1412 may communicate with the back-end components via the digital network 1430. In other embodiments, the locations 1412 and web-enabled devices 1414 may communicate with the back-end components 1404 via the same digital network 1430, but digital access rights, IP masking, and other network configurations may deny access of the web-enabled devices 1414. The web-enabled devices may also connect to the network 1430 via the encrypted, wireless router 1431.

The digital network 1430 may be a proprietary network, a secure public Internet, a virtual private network or some other type of network, such as dedicated access lines, plain ordinary telephone lines, satellite links, combinations of these, etc. Where the digital network 1430 includes the Internet, data communication may take place over the digital network 1430 via an Internet communication protocol. In addition to one or more web servers 1490 (described below), the back-end components 1404 may include a central processing system 1440 within a central processing facility. Of course, the locations 1412 may be communicatively connected to different back-end components 1404 having one or more functions or capabilities that are similar to the central processing system 1440. The central processing system 1440 may include processing circuitry (e.g., one or more computer processors) 1462 adapted and configured to execute various software applications and components of the platform 1400, in addition to other software applications, such as a medication management system.

The central processing system 1440, in some embodiments, further includes a database 1446 (which may include one or more databases). The database 1446 can be adapted to store data related to the operation of the platform 1400. The central processing system 1440 may access data stored in the database 1446 when executing various functions and tasks associated with the operation of the platform 1400.

Although the platform 1400 is shown to include a central processing system 1440 in communication with three locations 1412, and various web-enabled devices 1414 it should be understood that different numbers of processing systems, locations, and devices may be utilized. For example, the digital network 1430 (or other digital networks, not shown) may interconnect the platform 1400 to a number of included central processing systems 1440, hundreds of locations 1412, and thousands of web-enabled devices 1414. According to the disclosed example, this configuration may provide several advantages, such as, for example, enabling near real-time uploads and downloads of information as well as periodic uploads and downloads of information. This provides for a primary backup of all the information generated in the wireless data transfer process. Alternatively, some of the locations 1412 may store data locally on the facility server 1426 and/or the workstations 1428.

FIG. 14A also depicts one possible embodiment of the central processing system 1440. The central processing system 1440 may have a controller 1455 operatively connected to the database 1446 via a link 1456 connected to an input/output (I/O) circuit 1466. It should be noted that, while not shown, additional databases may be linked to the controller 1455 in a known manner.

The controller 1455 includes a program memory 1460, the processing circuitry 1462 (may be called a microcontroller or a microprocessor), a random-access memory (RAM) 1464, and the input/output (I/O) circuit 1466, all of which are interconnected via an address/data bus 1465. It should be appreciated that although only one microprocessor 1462 is shown, the controller 1455 may include multiple microprocessors 1462. Similarly, the memory of the controller 1455 may include multiple RAMs 1464 and multiple program memories 1460. Although the I/O circuit 1466 is shown as a single block, it should be appreciated that the I/O circuit 1466 may include a number of different types of I/O circuits. The RAM(s) 1464 and the program memories 1460 may be implemented as semiconductor memories, magnetically readable memories, and/or optically readable memories, for example. A link 1435 may operatively connect the controller 1455 to the digital network 1430 through the I/O circuit 1466.

FIG. 14B depicts one possible embodiment of the front-end components 1402 located in one or more of the locations 1412 from FIG. 14A. Although the following description addresses the design of the locations 1412, it should be understood that the design of one or more of the locations 1412 may be different from the design of others of the locations 1412. Also, each of the locations 1412 may have various different structures and methods of operation. It should also be understood that while the embodiment shown in FIG. 14B illustrates some of the components and data connections that may be present in a location 1412, it does not illustrate all of the data connections that may be present in a location 1412. For exemplary purposes, one design of a location is described below, but it should be understood that numerous other designs may be utilized.

Each of the locations 1412, as illustrated, has one or more portable computing devices 1433 (e.g., notebook computers, tablet computers, smart phones, personal data assistants, etc.) and/or a facility server 1426. The digital network 1484 and wireless router 1431 operatively connect the facility server 1426 to the number of portable computing devices 1433 and/or to other web-enabled devices 1414 and workstations 1428. The digital network 1430 may be a wide area network (WAN), a local area network (LAN), or any other type of digital network readily known to those persons skilled in the art. The digital network 1430 may operatively connect the facility server 1426, the portable computing devices 1433, the workstations 1428, and/or the other web-enabled devices 1414 to the central processing system 1440.

Each portable computing device 1433, workstation 1428, user device terminal 1428a, or facility server 1426 includes a controller 1470, as depicted in FIG. 14B in relation to the server 1426. Similar to the controller 1455 from FIG. 14A, the controller 1470 includes a program memory 1472, processing circuitry (e.g., one or more microcontrollers or microprocessors) 1474, a random-access memory (RAM) 1476, and an input/output (I/O) circuit 1480, all of which are interconnected via an address/data bus 1478. In some embodiments, the controller 1470 may also include, or otherwise be communicatively connected to, a database 1482. The database 1482 (and/or the database 1446 of FIG. 14A) includes data such as the data stored in the data repository 114 (FIG. 1). As discussed with reference to the controller 1455, it should be appreciated that although FIG. 14B depicts only one microprocessor 1474, the controller 1470 may include multiple microprocessors 1474. Similarly, the memory of the controller 1470 may include multiple RAMs 1476 and multiple program memories 1472. Although the FIG. 14B depicts the I/O circuit 1480 as a single block, the I/O circuit 1480 may include a number of different types of I/O circuits. The controller 1470 may implement the RAM(s) 1476 and the program memories 1472 as semiconductor memories, magnetically readable memories, and/or optically readable memories, for example.

Either or both of the program memories 1460 (FIG. 14A) and 1472 may also contain machine-readable instructions (i.e., software) 1471, for execution within the processing circuitry 1462 (FIG. 14A) and 1474, respectively. The software 1471 may perform the various tasks associated with operation of the location or locations, and may be a single module 1471 or a number of modules 1471a, 1471b. While the software 1471 is depicted in FIGS. 14A and 14B as including two modules, 1471a and 1471b, the software 1471 may include any number of modules accomplishing tasks related to location operation.

In addition to the controller 1470, the portable computing devices 1433, the workstations 1428 and the other web-enabled devices 1414 may further include a display and a keyboard as well as a variety of other input/output devices (not shown) such as a scanner, printer, mouse, touch screen, track pad, track ball, isopoint, voice recognition system, digital camera, bar code scanner, RFID reader, etc. A submitter 102 or reviewer 104 may sign on and occupy each portable computing device 1433, workstation 1428 or user device terminal 1428a to assist the employee in performing his or her duties. Employees may sign onto the portable computing device 1433, workstation 1428 or the user device terminal 1428a using any available technique, such as entering a user name and password. If an employee signs on to the system using a portable computing device 1433, the network 1484 communicates this information to the facility server 1426, so that the controller 1470 may identify which employees are signed onto the platform 1400 and which portable computing device 1433, workstation 1428 or user device terminal 1428a the employee is signed onto.

Various software applications resident in the front-end components 1402 and the back-end components 1404 implement functions related to location operation, and provide various user interface means to allow users to access the platform 1400. One or more of the front-end components 1402 and/or the back-end components 1404 may include a user-interface application 1411 for allowing a user to input and view data associated with the platform 1400, and to interact with the platform described herein. In one embodiment, the user interface application 1411 is a web browser applicant, and the facility server 1426 or the central processing system 1440 implements a server application 1413 for providing data to the user interface application 1411. However, the user interface application 1411 may be any type of interface, including a proprietary interface, and may communicate with the facility server 1426 or the central processing system 1440 using any type of protocol including, but not limited to, file transfer protocol (FTP), telnet, hypertext-transfer protocol (HTTP), etc. Moreover, some embodiments may include the user interface application 1411 running on one of the web-enabled devices 1414, while other embodiments may include the application 1411 running on the portable computing device 1433 in a location 1412. The central processing system 1440 and/or the facility server 1426 may implement any known protocol compatible with the user-interface application 1411 running on the portable computing devices 1433, the workstations 1428 and the web-enabled devices 1414 and adapted to the purpose of receiving and providing the necessary information during the data transfer process.

Figure 14C:
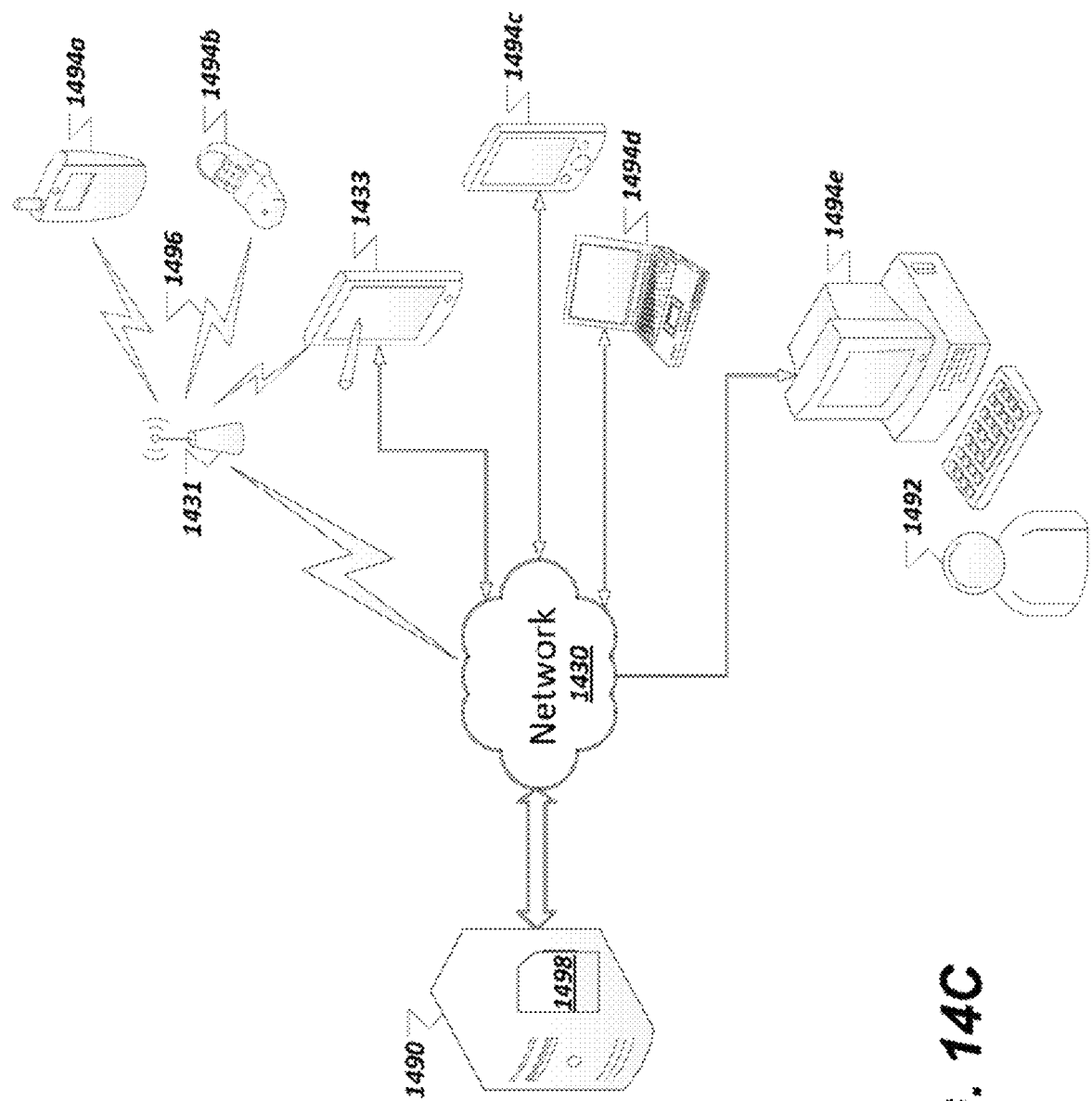
FIGS. 14C and 14D illustrate an example server interface for connecting user computing devices within a platform for image anomaly detection.

For purposes of implementing the platform 1400, the user interacts with location systems (e.g., the central processing system 1440) via a number of web pages. FIG. 14C depicts a web server 1490 connected via the network 1430 to a number of portable computing devices 1433 and other web-enabled devices through which a user 1492 may initiate and interact with the platform 1400. The web enabled devices may include, by way of example, a smart-phone 1494a, a web-enabled cell phone 1494b, a tablet computer 1433, a personal digital assistant (PDA) 1494c, a laptop computer 1494d, a desktop computer 1494e, a portable media player (not shown), etc. Of course, any web-enabled device appropriately configured may interact with the platform 1400. The web-enabled devices 1433 and 1494 need not necessarily communicate with the network 1430 via a wired connection. In some instances, the web enabled devices 1433 and 1494 may communicate with the network 1430 via wireless signals 1496 and, in some instances, may communicate with the network 1430 via an intervening wireless or wired device 1431, which may be a wireless router, a wireless repeater, a base transceiver station of a mobile telephony provider, etc. Each of the web-enabled devices 1433 and 1494 may interact with the web server 1490 to receive web pages, such as the web page 1498 depicted in FIG. 14C, for display on a display associated with the web-enabled device 1433 and 1494. It will be appreciated that although only one web server 1490 is depicted in FIG. 14C, multiple web servers 1490 may be provided for the purpose of distributing server load, serving different web pages, implementing different portions of the location web interface, etc.

Figure 14D:
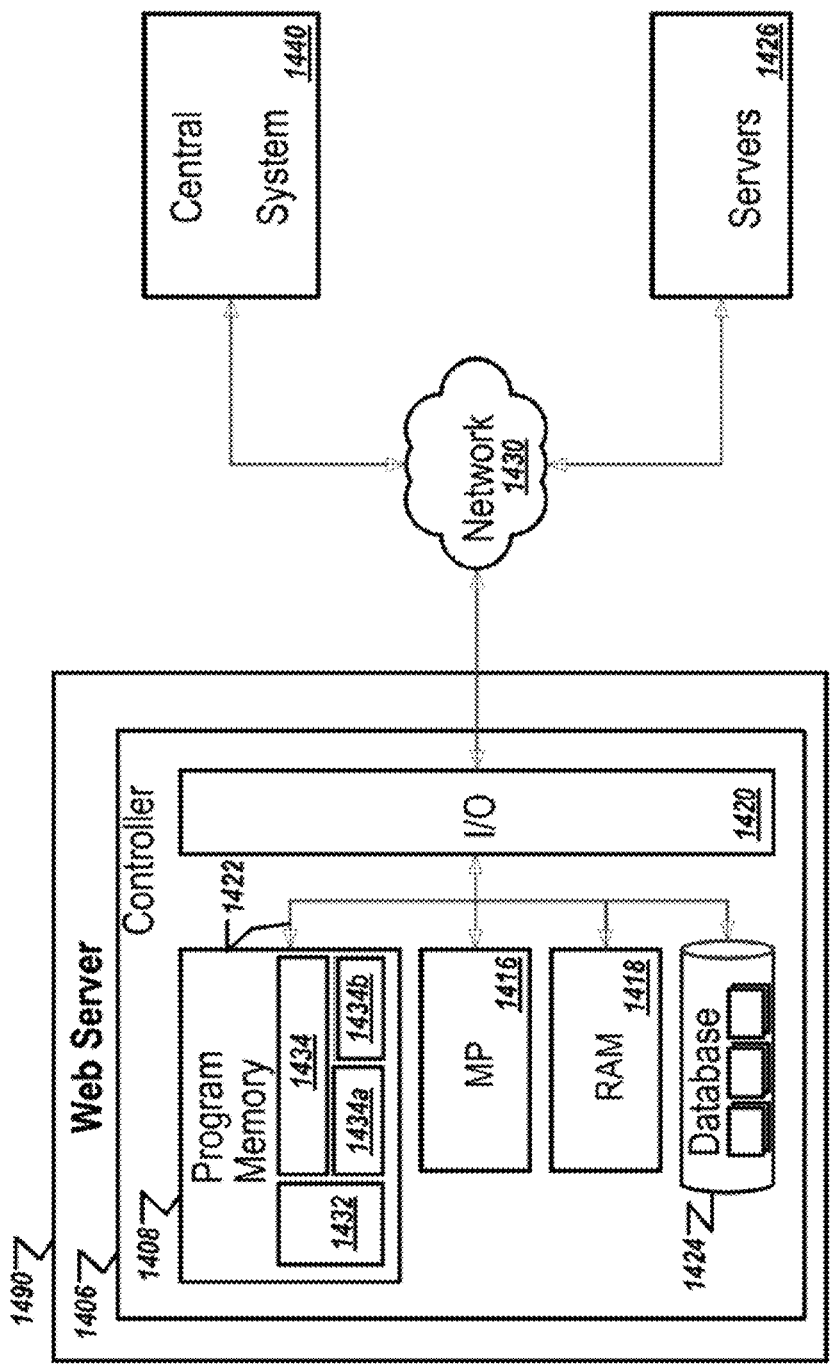

Turning now to FIG. 14D, the web server 1490, like the facility server 1426, includes a controller 1406. Similar to the controllers 1455 and 1470, the controller 1406 includes a program memory 1408, processing circuitry (e.g., one or more microcontrollers or microprocessors) 1416, a random-access memory (RAM) 1418, and an input/output (I/O) circuit 1420, all of which are interconnected via an address/data bus 1422. In some embodiments, the controller 1406 may also include, or otherwise be communicatively connected to, a database 1424 or other data storage mechanism (e.g., one or more hard disk drives, optical storage drives, solid state storage devices, etc.). The database 1424 may include data such as external source web profiles, product data, web page templates and/or web pages, and other data necessary to interact with the user 1492 through the network 1430. As discussed with reference to the controllers 1455 and 1470, it should be appreciated that although FIG. 14D depicts only one microprocessor 1416, the controller 1406 may include multiple microprocessors 1416. Similarly, the memory of the controller 1406 may include multiple RAMs 1418 and multiple program memories 1408. Although the FIG. 14D depicts the I/O circuit 1420 as a single block, the I/O circuit 1420 may include a number of different types of I/O circuits. The controller 1406 may implement the RAM (s) 1418 and the program memories 1408 as semiconductor memories, magnetically readable memories, and/or optically readable memories, for example.

In addition to being connected through the network 1430 to the user devices 1433 and 1494, as depicted in FIG. 14C, FIG. 14D illustrates that the web server 1490 may also be connected through the network 1430 to the central processing system 1440 and/or one or more facility servers 1426. As described below, connection to the central processing system 1440 and/or to the one or more facility servers 1426 facilitates the platform 1400.

The program memory 1408 and/or the RAM 1418 may store various applications for execution by the processing circuitry 1416. For example, an application 1432 may provide a user interface to the server, which user interface may, for example, allow a network administrator to configure, troubleshoot, or test various aspects of the server's operation, or otherwise to access information thereon. A server application 1434 operates to populate and transmit web pages to the web-enabled devices 1494, receive information from the user 1492 transmitted back to the server 1490, and forward appropriate data to the central processing system 1440 and the facility servers 1426, as described below. Like the software 1471, the server application 1434 may be a single module 1434 or a number of modules 1434*a*, 1434*b*. While the server application 1434 is depicted in FIG. 14D as including two modules, 1434*a* and 1434*b*, the server application 1434 may include any number of modules accomplishing tasks related to implantation of the web server 1490. By way of example, the module 1434*a* may populate and transmit the web pages and/or may receive and evaluate inputs from the user 1492 to facilitate in the wireless transfer of data from a first tablet to a second tablet, while the module 1434*b* may communicate with one or more of the back end components to provide the requested data.

Typically, a user may launch or instantiate a user interface application (e.g., a web browser or other submitter or reviewer application) from a web-enabled device, such as the web-enabled devices 1433 and 1494, to access the web server 1490 cooperating with the system 1440 to implement the platform 1400.

One or more processors can be utilized to implement any functions and/or algorithms described herein, unless explicitly stated otherwise. Additionally, any functions and/or algorithms described herein, unless explicitly stated otherwise, can be performed upon virtual processing circuitry (e.g., one or more virtual processors, for example on one or more physical computing systems such as a computer farm or a cloud drive).

Reference has been made to flowchart illustrations and block diagrams of methods, systems and computer program products according to implementations of this disclosure. Aspects thereof are implemented by computer program instructions. These computer program instructions may be provided to processing circuitry of a general purpose computer, special purpose computer, or other programmable data processing apparatus to produce a machine, such that the instructions, which execute via the processing circuitry of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The implementations described herein are directed to an image anomaly detection system that can detect anomalies associated with images, such as those submitted with appraisal reports, that can include duplicate images from previously submitted appraisal reports, degraded image quality, and modification of the images from an original version with a greatly reduced processing time compared with manual report review methods or other computer driven methods. As processing resources and capacities increase, processing times for the images decrease. In some implementations, the processing efficiency of the image anomaly detection system is increased due to the image assessments that are performed based on generated data structures that have a much smaller data size than the raw image files. For example, duplicate images are detected based on comparisons between eighteen-digit image IDs, which have a much smaller data size then 200 k pixel or greater images. In addition, the image quality anomalies and image modification anomalies can be detected based on the generated image quality indices that are included in the summary data tables. Therefore, the implementations described herein provide a significant technical improvement to image anomaly detection technologies.

The implementations described herein with respect to the image anomaly detection system also provide a technical solution to a technical problem because the image anomaly detection system is able to detect features of images that a person is unable to detect, such as slight variations in contrast, brightness, resolution, image size, duplicate images, etc. The image anomaly detection system 108 can also be used in other applications that involve detected anomalies present in images, such as evaluation of identification images that are used in passports, driver's licenses or other identification documents to address ever-increasing incidents of fraud in a digital world.

A number of implementations have been described. Nevertheless, it will be understood that various modifications may be made without departing from the spirit and scope of this disclosure. For example, preferable results may be achieved if the steps of the disclosed techniques were performed in a different sequence, if components in the disclosed systems were combined in a different manner, or if the components were replaced or supplemented by other components. The functions, processes and algorithms described herein may be performed in hardware or software executed by hardware, including computer processing circuitry (e.g., processors and/or programmable circuits) configured to execute program code and/or computer instructions to execute the functions, processes and algorithms described herein. Additionally, some implementations may be performed on modules or hardware not identical to those described. Accordingly, other implementations are within the scope that may be claimed.

The invention claimed is:

1. A device comprising:
   processing circuitry configured to:
   extract one or more images of an object from a submission obtained from at least one computing device, generate an image anomaly report including
an evaluation information data field including at least one of a type of the object, a type of evaluation performed on the object, a source of the submission, and a location of the object,
a detected duplicate image data field indicating whether duplicate images among the one or more images were detected,
an image quality data field indicating one or more image quality deficiencies detected among the one or more images,
an image modification data field indicating whether image modification was detected among the one or more images, and
a recommendations data field indicating recommendations relating to the object based on the detected duplicate image data field, the image quality data field, and the image modification data field; and
output the generated image anomaly report for display.

2. The device according to claim 1, wherein the evaluation information data field indicates that duplicate images among the one or more images were detected, indicates an amount of detected duplicate images, and provides representations of the detected duplicate images.

3. The device according to claim 1, wherein the image quality data field indicates an anomaly in at least one of file completeness, image resolution of the one or more images, image brightness of the one or more images, image contrast of the one or more images, and size consistency of the one or more images.

4. The device according to claim 1, wherein the image modification data field indicates that image modification was detected and indicates whether the modified images meet size consistency standards.

5. The device according to claim 1, wherein the recommendations data field indicates a recommendation to re-submit the submission or a recommendation to disapprove a contract related to the object.

6. A device comprising:
processing circuitry configured to:
extract one or more images of an object from a submission obtained from at least one computing device,
generate a plurality of a duplicate flag, a quality flag, and a modification flag directed to one or more anomalies detected in the submission based on at least one of predetermined image features of the one or more images, an image type of the one or more images, and submission attributes,
generate an evaluation report including the generated plurality of the duplicate flag, the quality flag, and the modification flag, the evaluation report further including recommendations relating to the object based on the detected one or more anomalies, and
output the generated evaluation report for display.

7. The device of claim 6, the processing circuitry is further configured to output the generated evaluation report to the at least one computing device.

8. The device of claim 6, wherein the duplicate flag indicates an anomaly of duplicate images in the submission, the quality flag indicates an anomaly in quality of the one or more images, and the modification flag indicates an anomaly of improper modification of the one or more images.

9. The device of claim 6, wherein the recommendations include at least one of a recommendation to re-submit the submission, a recommendation whether to execute a contract relating to the object, and a recommendation relating to a risk level of a previously executed contract relating to the object.

10. The device of claim 6, wherein the generated evaluation report includes information for assessing performance of a preparer of the submission.

11. The device of claim 6, wherein the processing circuitry, in order to generate the at least one of the duplicate flag, the quality flag, or the modification flag, generates, for each of the one or more images, an image identification (ID) value as a combination of pixel brightness values of the respective image.

12. The device of claim 11, wherein the processing circuitry generates the duplicate flag based on a matching ID value generated for two of the one or more images or based on a matching ID value generated for one of one or more images and another image corresponding to a different submission.

13. The device of claim 12, wherein the processing circuitry is further configured to dismiss generation of the duplicate flag when the different submission is submitted within a predetermined period of time of the submission.

14. The device of claim 6, wherein the processing circuitry is further configured to generate a summary data table for the submission including one or more image quality indices and the submission attributes.

15. The device of claim 14, wherein the one or more image quality indices include at least one of a file completeness index, an image resolution index, an image brightness index, an image contrast index, and a size consistency index, and
the processing circuitry generates the quality flag based on the one or more image quality indices.

16. The device of claim 15, wherein
the processing circuitry determines the file completeness index for the submission based on the submission attributes and a predetermined file submission standard,
the processing circuitry determines the image resolution index by
determining a photo index value for each of the one or more images of the submission based on a size of each of the one or more images and a predetermined image resolution standard, and
calculating the image resolution index based on an average of photo index values,
the processing circuitry determines the image brightness index based on brightness values of one or more pixels in each of the one or more images and a predetermined image brightness standard,
the processing circuitry determines the image contrast index for the submission based on a portion of each of the one or more images having contrast values greater than an upper contrast threshold or less than a lower contrast threshold, and
the processing circuitry determines the size consistency index for the submission based on an amount of consistency between image sizes of the one or more images.

17. A method comprising:
extracting, by processing circuitry of one or more computing systems, one or more images of an object from a submission obtained from at least one computing device;
generating, by the processing circuitry, a plurality of a duplicate flag, a quality flag, and a modification flag directed to one or more anomalies detected in the submission based on at least one of predetermined image features of the one or more images, an image type of the one or more images, and submission attributes, generating an evaluation report including the generated plurality of the duplicate flag, the quality flag, and the modification flag, the evaluation report further including recommendations relating to the object based on the detected one or more anomalies, and outputting the generated evaluation report for display.

* * * * *